United States Patent
Choi et al.

(10) Patent No.: US 11,861,769 B2
(45) Date of Patent: Jan. 2, 2024

(54) ELECTRONIC DEVICE AND OPERATING METHOD THEREOF

(71) Applicant: SAMSUNG ELECTRONICS CO., LTD., Suwon-si (KR)

(72) Inventors: Saeeun Choi, Suwon-si (KR); Gihoon Park, Suwon-si (KR); Sangshin Park, Suwon-si (KR); Eun-Ae Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 505 days.

(21) Appl. No.: 16/936,942

(22) Filed: Jul. 23, 2020

(65) Prior Publication Data

US 2021/0042558 A1   Feb. 11, 2021

(30) Foreign Application Priority Data

Aug. 9, 2019   (KR) .......................... 10-2019-0097647

(51) Int. Cl.
| | |
|---|---|
| *G06T 11/60* | (2006.01) |
| *G06F 3/04855* | (2022.01) |
| *G06N 3/08* | (2023.01) |
| *G06T 5/50* | (2006.01) |
| *G06F 18/2431* | (2023.01) |

(52) U.S. Cl.
CPC .......... *G06T 11/60* (2013.01); *G06F 3/04855* (2013.01); *G06F 18/2431* (2023.01); *G06N 3/08* (2013.01); *G06T 5/50* (2013.01)

(58) Field of Classification Search
CPC . G06T 5/50; G06T 11/60; G06T 2207/20081; G06T 2207/20084; G06T 2207/20221; G06T 7/11; G06T 7/12; G06N 3/08; G06N 3/02; G06N 3/0454
USPC ................................ 382/190, 173, 285, 276
See application file for complete search history.

(56) References Cited

U.S. PATENT DOCUMENTS

| | | | |
|---|---|---|---|
| 2019/0108386 A1 | 4/2019 | Sato | |
| 2019/0108628 A1 | 4/2019 | Sato | |
| 2019/0116214 A1 | 4/2019 | Lal et al. | |
| 2019/0168668 A1* | 6/2019 | Chan | ........................ B60Q 9/00 |

FOREIGN PATENT DOCUMENTS

| | | | | |
|---|---|---|---|---|
| CN | 108230343 A | * | 6/2018 | ........... G06T 3/4038 |
| WO | WO-2018135246 A1 | * | 7/2018 | ......... G06K 9/00302 |

OTHER PUBLICATIONS

Chuanxia Zheng, Tat-Jen Cham, and Jianfei Cai. T2net: Synthetic-to-realistic translation for solving single-image depth estimation tasks. In ECCV, 2018. (Year: 2018).*

(Continued)

*Primary Examiner* — Andrae S Allison
(74) *Attorney, Agent, or Firm* — Sughrue Mion, PLLC

(57) ABSTRACT

The electronic device includes a memory storing one or more instructions, and a processor configured to execute the one or more instructions to: receive a selection of a location of a synthesis region in an input image, obtain a target object image to be located in the synthesis region of the input image, by using at least one object detected in the input image, generate a composite image by combining the input image with the target object image, and control a display of the electronic device to display the composite image.

20 Claims, 32 Drawing Sheets

(56) References Cited

OTHER PUBLICATIONS

PNVR, Koutilya, Hao Zhou, and David Jacobs. "Sharingan: Combining synthetic and real data for unsupervised geometry estimation." Proceedings of the IEEE/CVF Conference on Computer Vision and Pattern Recognition. 2020. (Year: 2020).*

Suzuki et al., "Collaging on Internal Representations: An Intuitive Approach for Semantic Transfiguration," Nov. 26, 2018, XP081041097, arXiv:1811.10153v1 [cs.CV], 16 pages.

Suzuki et al., "Spatially Controllable Image Synthesis with Internal Representation Collaging," Apr. 9, 2019, XP081199700, arXiv:1811.10153v2 [cs.CV], 14 pages.

Lin et al., "ST-GAN: Spatial Transformer Generative Adversarial Networks for Image Compositing," IEEE/CVF Conference on Computer Vision and Pattern Recognition Jun. 18, 2018, XP033473872, 10 pages.

Chen et al., "Toward Realistic Image Composition with Adversarial Learning," IEEE/CVF Conference on Computer Vision and Pattern Recognition (CVPR), Jun. 15, 2019, DOI: 10.1109/CVPR.2019.00861,XP033686368, 10 pages.

Lee et al., "Context-Aware Synthesis and Placement of Object Instances," Dec. 7, 2018, arxiv.1812.02350v2 [cs.CV], XP080989728, 11 pages.

Communication dated Jan. 15, 2021 by the European Patent Office in corresponding European Application No. 20188900.3.

Communication dated Feb. 8, 2023, issued by the European Patent Office in counterpart European Application No. 20188900.3.

Office Action dated Aug. 24, 2023, issued by Korean Patent Office in Korean Patent Application No. 10- 2019-0097647.

Notice of Allowance dated Jun. 27, 2023, issued by European Patent Office in European Patent Application No. 20188900.3.

\* cited by examiner

ELECTRONIC DEVICE AND OPERATING METHOD THEREOF

CROSS-REFERENCE TO RELATED APPLICATION(S)

This application is based on and claims priority under 35 U.S.C. § 119 to Korean Patent Application No. 10-2019-0097647, filed on Aug. 9, 2019, in the Korean Intellectual Property Office, the disclosure of which is incorporated by reference herein in its entirety.

BACKGROUND

1. Field

The disclosure relates to an electronic device and an operating method thereof, and more particularly, to an electronic device for combining two different images, and an operating method of the electronic device.

2. Description of Related Art

Users may add a desired object image to a background image by using an image/video editing tool such as Photoshop to obtain a more satisfactory image. For example, users may utilize various related art functions of an image editing tool to combine two different images.

FIG. 1 is a view illustrating a related art method of combining two or more images.

For example, referring to FIG. 1, a user initially prepares a target image to be combined with an input image (operation 10), crops a desired object image from the target image (operation 20), pastes the object image onto the input image, removes a background of the object image by using, for example, a layer mask (operation 30), edits details by using a brush or selection tool to achieve naturalness (operation 40), and thus generates a composite image (operation 50).

As described above, the related art method using image editing tools requires many tools and much time to combine two different images.

That is, a desired target image to be combined with an input image needs to be obtained through, for example, searching or capturing.

Further, a background region to be removed from the target image needs to be manually selected by using a brush tool and a layer mask needs to be used to hide the background region. When a boundary between the background region to be removed and an object region to be used is not clear, much time might be taken to completely remove the background region and users unfamiliar with using the layer mask might have difficulties.

In addition, when a user is not satisfied with a composite image generated using the related art method, the user needs to start over from the selection of the target image and perform all of the operations again.

SUMMARY

Provided are an electronic device for conveniently providing an image synthesis function, and an operating method of the electronic device.

Provided are an electronic device for generating and providing candidate images appropriate for an input image on behalf of a user, and an operating method of the electronic device.

Provided are an electronic device for changing a style of candidate images to be appropriate for an input image, by using features of a synthesis location selected in the input image by a user, and an operating method of the electronic device.

Provided are an electronic device for updating candidate images appropriate for an input image, according to the control of a user to allow the user to more conveniently select a desired composite image, and an operating method of the electronic device.

Additional aspects will be set forth in part in the description which follows and, in part, will be apparent from the description, or may be learned by practice of the presented embodiments.

In accordance with an aspect of the disclosure, an electronic device includes a memory storing one or more instructions, and a processor configured to execute the one or more instructions stored in the memory to receive a selection of a location of a synthesis region in an input image to be combined with a target object image, obtain, by using one or more neural networks, the target object image to be located in the synthesis region by using one or more objects detected in the input image, and generate, by using one or more neural networks, a composite image by combining the input image with the obtained target object image.

The processor may be further configured to execute the one or more instructions to detect the one or more objects in the input image and obtain an object class corresponding to each of the one or more objects, and location information of each of the one or more objects in the input image, by using a first neural network, and obtain distance information from the synthesis region to each of the one or more objects, based on location information of the synthesis region and the location information of each of the one or more objects.

The processor may be further configured to execute the one or more instructions to obtain a class vector of a target object, based on the obtained one or more object classes, by using a second neural network.

The processor may be further configured to execute the one or more instructions to obtain a class vector of each of the one or more objects by using the second neural network, and obtain a class vector of the target object adjacent to the obtained class vectors of the one or more objects, based on the distance information from the synthesis region to each of the one or more objects, by using a word embedding lookup table generated based on the second neural network.

The processor may be further configured to execute the one or more instructions to obtain the class vector of the target object by allocating a higher weight to the class vector of the object closer to the location of the synthesis region.

The processor may be further configured to execute the one or more instructions to generate a target object image corresponding to the obtained class vector of the target object, by using a third neural network.

The processor may be further configured to execute the one or more instructions to extract synthesis region image features corresponding to an image of the synthesis region, by using a fourth neural network, and generate the target object image corresponding to the class vector of the target object, by reflecting the extracted synthesis region image features, by using the third neural network.

The processor may be further configured to execute the one or more instructions to combine the target object image with the input image by reflecting the extracted synthesis region image features, by using a fifth neural network.

The processor may be further configured to execute the one or more instructions to display the composite image on a display, and generate an updated target object image according to a user input for controlling the target object image included in the displayed composite image, and display the updated target object image.

The processor may be further configured to execute the one or more instructions to output a scroll bar for controlling an update of the target object image, obtain an updated class vector adjacent to the class vector corresponding to the target object, according to the user input to control the output scroll bar, obtain the updated target object image, based on the updated class vector, and generate the composite image by combining the input image with the updated target object image, and display the composite image.

In accordance with an aspect of the disclosure, an operating method of an electronic device includes receiving a selection of a location of a synthesis region in an input image to be combined with a target object image, obtaining, by using one or more neural networks, the target object image to be located in the synthesis region by using one or more objects detected in the input image, and generating, by using one or more neural networks, a composite image by combining the input image with the obtained target object image.

In accordance with an aspect of the disclosure, a computer-readable recording medium has recorded thereon a computer program for executing an operating method of an electronic device, the operating method including receiving a selection of a location of a synthesis region in an input image to be combined with a target object image, obtaining, by using one or more neural networks, the target object image to be located in the synthesis region by using one or more objects detected in the input image, and generating, by using one or more neural networks, a composite image by combining the input image with the obtained target object image.

BRIEF DESCRIPTION OF THE DRAWINGS

The above and other aspects, features, and advantages of certain embodiments of the present disclosure will be more apparent the following description taken in conjunction with the accompanying drawings, in which.

DETAILED DESCRIPTION

Figure 1:
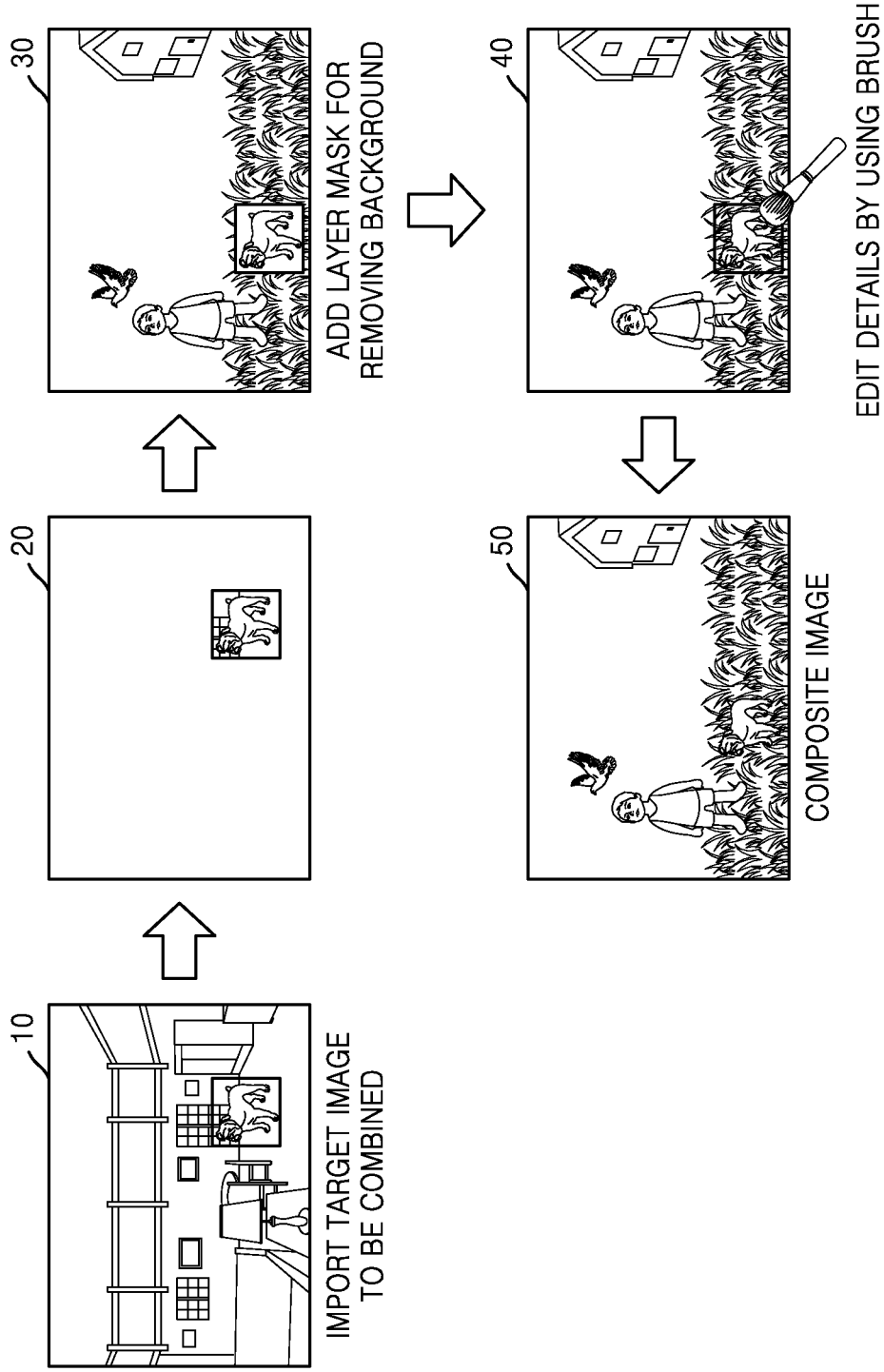
FIG. 1 is a view illustrating a related art method of combining two or more images.

Terminology used herein will now be briefly described.

Although the terms used herein are selected, as much as possible, from general terms that are widely used at present while taking into consideration the functions obtained in accordance with embodiments, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described herein. Therefore, it is noted that the terms used herein are construed based on practical meanings thereof and the content of embodiments described herein, rather than being simply construed based on names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Herein, the expression "at least one of a, b or c" indicates only a, only b, only c, both a and b, both a and c, both b and c, all of a, b, and c, or variations thereof.

Hereinafter, certain embodiments will be described with reference to the attached drawings. Embodiments may, however, be embodied in many different forms and should not be construed as being limited to the embodiments set forth herein. In the drawings, parts not related to the description are not illustrated for clarity of explanation, and like reference numerals denote like elements throughout.

As used herein, the term "user" denotes a person who controls the function or operation of an image display device by using a controller, and may include a viewer, a manager, or an installation engineer.

Figure 2:
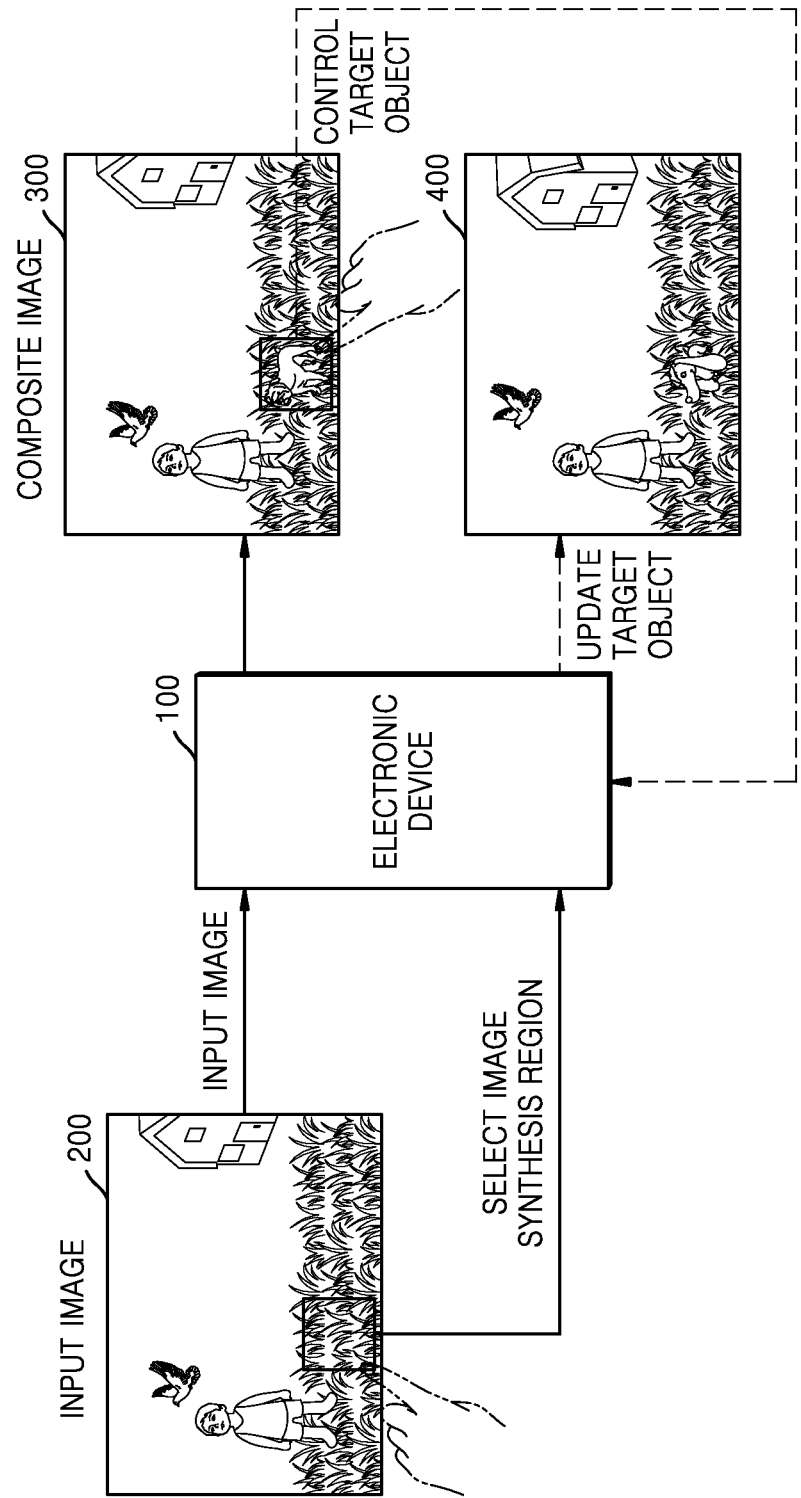
FIG. 2 shows an example of an electronic device according to an embodiment.

Referring to FIG. 2, the electronic device 100 receives an input image 200 to be used for image synthesis and a selection of a synthesis region, for example, via a touch input of a user 202 who uses a finger, a stylus, and the like, in the input image 200 to be combined with a target object image. The electronic device 100 combines two different images. For example, among the two different images, an image serving as a background is called an input image and an image including an object to be combined with the input image is called a target object image. However, the two different images may also be called a first image and a second image.

According to an embodiment, the electronic device 100 may generate a target object image to be combined with the input image 200, and generate and output a composite image 300 by combining the input image 200 with the target object image, based on the input image 200 and the selection of the synthesis region to be combined with the target object image, by using one or more neural networks.

According to an embodiment, the electronic device 100 may detect one or more objects in the input image 200 by using one or more neural networks. For example, the electronic device 100 may detect objects such as a boy, a bird, and a house in the input image 200 illustrated in FIG. 2. Information on the objects detected in the input image 200 may include object classes of the objects and distance information from the synthesis region to the objects.

According to an embodiment, the electronic device 100 may generate a target object to be combined with the synthesis region of the input image 200, based on the object classes of the one or more objects detected in the input image 200 and the distances from the synthesis region to the objects by using one or more neural networks. For example, the electronic device 100 may generate a dog or a cat as the target object to be combined with the synthesis region, based on the objects such as the boy, the bird, and the house detected in the input image 200 illustrated in FIG. 2.

According to an embodiment, the electronic device 100 may generate a target object image corresponding to the generated target object, by using one or more neural networks. The electronic device 100 may generate the target object image to be naturally combined with the input image 200, by reflecting features of the synthesis region of the input image 200 to generate the target object image. For example, when the target object image including a dog or a cat is generated and when the features of the synthesis region indicate a grass image, the electronic device 100 may change the style of the target object image including a dog or a cat, to be appropriate for grass texture or color.

According to an embodiment, the electronic device 100 may generate the composite image 300 by combining the generated target object image with the input image 200 by using one or more neural networks. The electronic device 100 may naturally combine the input image 200 with the target object image by reflecting the features of the synthesis region of the input image 200 to generate the composite image 300. For example, when the input image 200 is combined with the target object image including a dog or a cat and when the features of the synthesis region indicate a grass image, the electronic device 100 may naturally generate edges of the target object image including a dog or a cat, by using grass features.

According to an embodiment, the electronic device 100 may update the target object image according to a user input for controlling the target object image in the composite image 300, and generate and output an updated composite image 400 by combining the updated target object image with the input image 200. For example, when the electronic device 100 outputs the composite image 300 including a <Bulldog> as the target object and when a user desires a dog of another species than a Bulldog as the target object, the electronic device 100 may generate and output the updated composite image 400 including a <Cocker Spaniel> as the target object.

As described above, the electronic device 100 may use one or more neural networks appropriate for each of one or more operations performed to combine two or more images. A neural network is a statistical learning algorithm for implementing machine learning by emulating the brain of a human.

Figure 3:
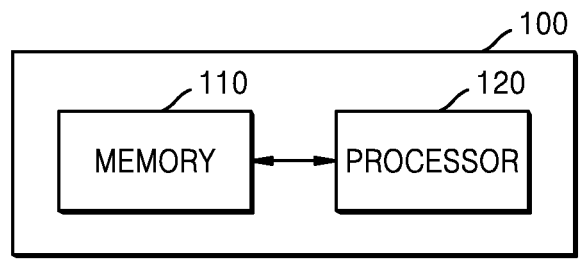
FIG. 3 is a block diagram of an electronic device according to an embodiment.

FIG. 3 is a block diagram of the electronic device 100 according to an embodiment.

Referring to FIG. 3, the electronic device 100 may include a memory 110 and one or more processors 120. However, the electronic device 100 may include a greater number of elements compared to the illustrated elements, and is not limited to the above examples.

The memory 110 according to an embodiment may store programs for process and control operations of the processor 120, and store data input to or to be output from the electronic device 100.

The memory 110 may include at least one type of storage medium from among flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, or an optical disc.

The processor 120 controls overall operations of the electronic device 100. For example, the processor 120 may execute one or more instructions stored in the memory 110, to perform functions of the electronic device 100.

The processor 120 according to an embodiment may combine two or more different images and output a composite image by using a learning model using one or more neural networks.

In an embodiment, the processor 120 may execute the one or more instructions stored in the memory 110, to control the various operations to be performed.

In an embodiment, the processor 120 may include an internal memory storing one or more instructions, and execute the one or more instructions stored in the internal memory, to control the various operations to be performed. That is, the processor 120 may execute at least one instruction or program stored in the memory 110 or the internal memory included in the processor 120, to perform a certain operation.

Although one processor 120 is illustrated in FIG. 3, a plurality of processors may be included. In this case, each of operations to be performed by the electronic device 100 according to an embodiment may be performed using at least one of the plurality of processors.

According to an embodiment, the electronic device 100 may further include a neural network processor. The neural network processor may control a certain operation to be performed, by performing computation through a neural network. Specifically, in an embodiment, the neural network processor may execute one or more instructions to perform computation through a neural network.

According to an embodiment, the processor 120 may execute the one or more instructions stored in the memory 110, to receive a selection of a location of a synthesis region in an input image to be combined with a target object image, obtain, by using one or more neural networks, the target object image to be located in the synthesis region by using one or more objects detected in the input image, and generate, by using one or more neural networks, a composite image by combining the input image with the obtained target object image.

According to an embodiment, the processor 120 may execute the one or more instructions stored in the memory 110, to detect the one or more objects in the input image and obtain an object class corresponding to each of the one or more objects, and location information of each of the one or more objects in the input image, by using a first neural network, and obtain distance information from the synthesis region to each of the one or more objects, based on location information of the synthesis region and the location information of each of the one or more objects. By obtaining the distance information from the synthesis region to each of the one or more objects, target objects appropriate for the synthesis region may be obtained based on relative locations between the synthesis region of the input image and the objects detected in the input image.

According to an embodiment, the processor 120 may execute the one or more instructions to obtain a class vector of a target object, based on the obtained one or more object classes, by using a second neural network.

According to an embodiment, the processor 120 may execute the one or more instructions to obtain a class vector of each of the one or more objects by using the second neural network, and obtain a class vector of the target object adjacent to the obtained class vectors of the one or more objects, based on the distance information from the synthesis region to each of the one or more objects, by using a word embedding lookup table generated based on the second neural network. When the class vector of the target object adjacent to the obtained class vectors of the one or more objects is obtained based on the distance information from the synthesis region to each of the one or more objects, the user does not need to manually search for target objects to be located in the synthesis region and appropriate target objects may be automatically obtained using artificial intelligence (AI).

According to an embodiment, the processor 120 may execute the one or more instructions to obtain the class vector of the target object by allocating a higher weight to the class vector of the object closer to the location of the synthesis region. By allocating a higher weight to the class vector of the object closer to the location of the synthesis region, a greater number of target objects more appropriate for an object located close to the synthesis region may be extracted.

According to an embodiment, the processor 120 may execute the one or more instructions to generate a target object image corresponding to the obtained class vector of the target object, by using a third neural network.

According to an embodiment, the processor 120 may execute the one or more instructions to extract synthesis region image features corresponding to an image of the synthesis region, by using a fourth neural network, and generate the target object image corresponding to the class vector of the target object, by reflecting the extracted synthesis region image features, by using the third neural network. By reflecting the synthesis region image features to generate the target object images, the target object images having a style that is more natural to the synthesis region may be obtained.

According to an embodiment, the processor 120 may execute the one or more instructions to combine the target object image with the input image by reflecting the extracted synthesis region image features, by using a fifth neural network. By reflecting the synthesis region image features to combine the input image with the target object image, edges of the target object images to be combined with the input image may be extracted to look more naturally to a user.

According to an embodiment, the processor 120 may execute the one or more instructions to display the composite image on a display, and generate an updated target object image according to a user input for controlling the target object image included in the displayed composite image, and display the updated target object image. By providing the composite image including the updated target object image, according to the user input for controlling the target object image, when the user does not like the target object included in the initially generated composite image, a composite image including another target object image may be easily provided according to a simple user input.

According to an embodiment, the processor 120 may execute the one or more instructions to output a scroll bar for controlling an update of the target object image, obtain an updated class vector adjacent to the class vector corresponding to the target object, according to the user input to control the output scroll bar, obtain the updated target object image, based on the updated class vector, and generate the composite image by combining the input image with the updated target object image, and display the composite image.

Functions associated with combination of two or more images using AI according to the disclosure are performed using the processor 120 and the memory 110. The processor 120 may include one or more processors. In this case, the one or more processors may include processors such as central processing units (CPUs), application processors (APs), and digital signal processors (DSPs), dedicated graphics processors such as graphics processing units (GPUs) and vision processing units (VPUs), or dedicated AI processors such as neural processing units (NPUs). The one or more processors control input data to be processed according to a predefined operation rule or AI model stored in memory. Alternatively, when the one or more processors are dedicated AI processors, the dedicated AI processors may be designed in a hardware structure specialized in processing of a specific AI model.

The predefined operation rule or AI model is made through training. Herein, being made through training means that a basic AI model is trained based on a learning algorithm by using multiple pieces of training data and thus a predefined operation rule or AI model configured to achieve desired characteristics (or purposes) is made. The training may be performed directly by a device having an AI function according to the disclosure, or through a separate server and/or system. The learning algorithm may include, for example, supervised learning, unsupervised learning, semi-supervised learning, or reinforcement learning, but is not limited thereto.

The AI model may include a plurality of neural network layers. Each of the plurality of neural network layers has a plurality of weight values and performs neural network computation through computation between a computation result of a previous layer and the plurality of weight values. The plurality of weight values of the plurality of neural network layers may be optimized based on a result of training the AI model. For example, the plurality of weight values may be updated to reduce or minimize a loss value or a cost value obtained by the AI model during the training process. An artificial neural network may include, for example, a CNN, a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

According to an embodiment, the electronic device 100 may generate a composite image by combining an input image with one or more target object images by using one or more neural networks, and transmit the generated composite image to an externally connected display device by using a video/audio signal output port or wireless communication to display the composite image. For example, the electronic device 100 may include a device for mainly processing data and transmitting the processed data to an external display device, e.g., a set-top box.

Figure 4:
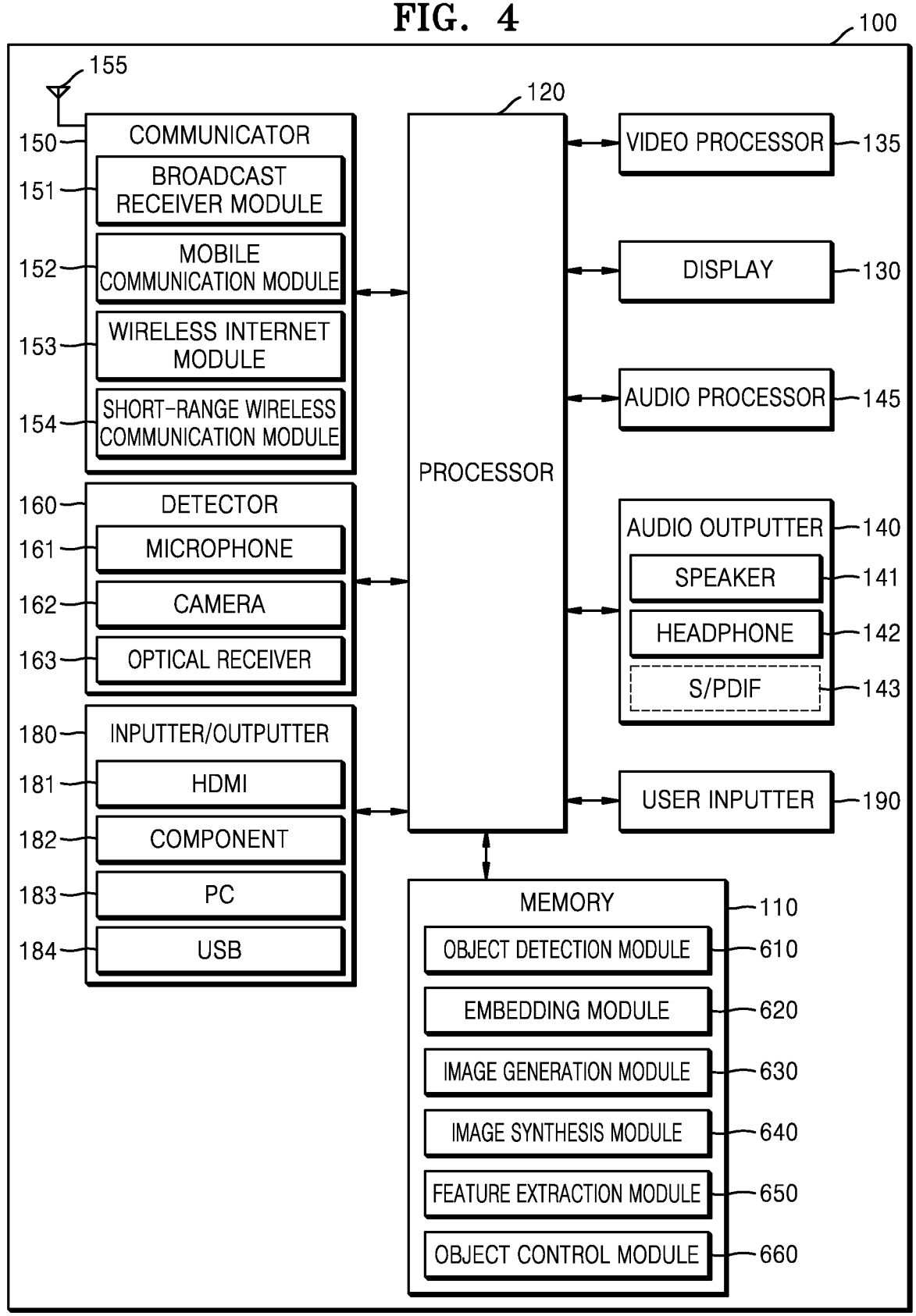
FIG. 4 is a detailed block diagram of an electronic device according to an embodiment.

FIG. 4 is a detailed block diagram of the electronic device 100 according to an embodiment.

In FIGS. 3 and 4, like reference numerals denote like elements. Therefore, the descriptions provided above in relation to FIG. 3 will not be repeated herein to describe the electronic device 100.

Referring to FIG. 4, in addition to the memory 110 and the processor 120, the electronic device 100 may further include a display 130, one or more antennas 155, a communicator 150, a detector 160, an inputter/outputter 180, a video processor 135, an audio processor 145, an audio outputter 140, and a user inputter 190.

The descriptions of the memory 110 and the processor 120 are provided above in relation to FIG. 3 and will not be repeated in relation to FIG. 4.

The display 130 may display an image on a screen under the control of the processor 120. The image to be displayed on the screen may be received from the communicator 150, the inputter/outputter 180, or the memory 110.

According to an embodiment, the display 130 may display a composite image generated by the processor 120. The display 130 may also display a composite image including a target object image updated according to a user input for controlling the target object image included in the composite image.

The antenna 155 serves to receive or transmit signals from or to other devices. Although one antenna 155 is illustrated, a plurality of antennas may be included. Therefore, the electronic device 100 according to the disclosure may support multiple-input multiple-output (MIMO) systems.

The communicator 150 may include one or more modules capable of enabling wireless communication between the electronic device 100 and a wireless communication system or between the electronic device 100 and a network including another electronic device. For example, the communicator 150 may include a broadcast receiver module 151, a mobile communication module 152, a wireless internet module 153, and a short-range wireless communication module 154. The communicator 150 may also be called a transmitter/receiver.

The broadcast receiver module 151 receives broadcast signals and/or broadcast information through broadcast channels from an external broadcast management server. The broadcast signals may include TV broadcast signals, radio broadcast signals, and data broadcast signals, and/or may include broadcast signals in which TV broadcast signals or radio broadcast signals are combined with data broadcast signals.

The mobile communication module 152 transmits and receives wireless signals to and from at least one of a base station, an external device, or a server in a mobile communication network. The wireless signals may include voice call signals, video call signals, or various types of data associated with transmission and reception of text/multimedia messages.

The wireless internet module 153 refers to a module for wireless internet access, and may be provided as an embedded or external module. As wireless internet technology, for example, wireless local area network (WLAN) (e.g., Wi-Fi), wireless broadband (Wibro), worldwide interoperability for microwave access (Wimax), or high-speed downlink packet access (HSDPA) may be used. Through the wireless internet module 153, the electronic device 100 may establish a Wi-Fi peer-to-peer (P2P) connection to another device. Due to the Wi-Fi P2P connection, a streaming service, a data transmission/reception service, or a printing service based on connection to a printer may be provided between devices.

The short-range wireless communication module 154 refers to a module for short-range wireless communication. As short-range wireless communication technology, for example, Bluetooth, radio-frequency identification (RFID), Infrared Data Association (IrDA), ultra-wideband (UWB), or ZigBee may be used.

The communicator 150 according to an embodiment may receive, from an external server, a learning model using one or more neural networks.

The detector 160 detects voice of a user, an image of the user, or interaction of the user, and may include a microphone 161, a camera 162, and an optical receiver 163.

The microphone 161 receives voice uttered by the user. The microphone 161 may convert the received voice into an electrical signal and output the electrical signal to the processor 120.

The camera 162 may receive an image (e.g., consecutive frames) corresponding to motion (including a gesture) of the user in a camera recognition range.

The optical receiver 163 receives an optical signal (including a control signal) from a remote controller. The optical receiver 163 may receive, from the remote controller, an optical signal corresponding to a user input (e.g., touch, press, a touch gesture, voice, or motion). A control signal may be extracted from the received optical signal under the control of the processor 120.

In an embodiment, a selection of a location of a synthesis region in an input image to be combined with a target object image may be received through one or more of the microphone 161, the camera 162, and the optical receiver 163. When the uses desires to control an update of a target object in an output composite image, a target object control command may be received through one or more of the microphone 161, the camera 162, and the optical receiver 163. For example, the selection of the location or the target object control command may include one or more of a user utterance detected using the microphone 161, a user gesture detected using the camera 162, or a control signal received by the optical receiver 163 from the remote controller. However, this is not limiting and the user selection input may be received via a touch screen of the display 130.

The inputter/outputter 180 receives, for example, video data (e.g., a moving image), audio data (e.g., voice or music), and additional information (e.g., an electronic program guide (EPG)) from outside the electronic device 100 under the control of the processor 120. The inputter/outputter 180 may include one of a high-definition multimedia interface (HDMI) port 181, a component jack 182, a computer port 183, and a Universal Serial Bus (USB) port 184. The inputter/outputter 180 may include a combination of the HDMI port 181, the component jack 182, the computer port 183, and the USB port 184.

The memory 110 according to an embodiment may store programs for process and control operations of the processor 120, and store data input to or to be output from the electronic device 100. The memory 110 may also store data required for operations of the electronic device 100.

The programs stored in the memory 110 may be classified into a plurality of modules depending on functions thereof. Specifically, the memory 110 may store one or more programs for performing a certain operation by using a neural network. For example, the one or more programs stored in the memory 110 may include an object detection module 610, an embedding module 620, an image generation module 630, an image synthesis module 640, a feature extraction module 650, and an object control module 660.

The object detection module 610 may include one or more instructions for detecting one or more objects in an input image by using one or more neural networks.

The embedding module 620 may generate a target object to be combined with a synthesis region of the input image, based on the one or more objects detected in the input image and locations of the one or more objects by using one or more neural networks.

The image generation module 630 may generate a target object image corresponding to the generated target object, by using one or more neural networks. The image generation module 630 may generate the target object image to be naturally combined with the input image, by reflecting features of the synthesis region of the input image to generate the target object image.

The image synthesis module 640 may generate a composite image by combining the generated target object image with the input image by using one or more neural networks. The image synthesis module 640 may naturally combine the input image with the target object image by reflecting the features of the synthesis region of the input image to generate the composite image.

The feature extraction module 650 may extract the features from the synthesis region in the input image to be combined with the target object image, by using one or more neural networks.

The object control module 660 may update the target object image according to a user input for controlling the target object image in the composite image, and generate and output a composite image by combining the updated target object image with the input image.

The processor 120 serves to control overall operations of the electronic device 100 and signal flows between the internal elements of the electronic device 100, and process data. When a user input is made or a preset and prestored condition is satisfied, the processor 120 may execute an operating system (OS) and various applications stored in the memory 110.

The processor 120 may include an internal memory. In this case, at least one of data, programs, or instructions stored in the memory 110 may be stored in the internal memory of the processor 120. For example, the internal memory of the processor 120 may store one or more programs for performing certain operations by using a neural network, or one or more instructions for performing certain operations by using a neural network.

According to an embodiment, the processor 120 may execute one or more instructions included in the object detection module 610, the embedding module 620, the image generation module 630, the image synthesis module 640, the feature extraction module 650, and the object control module 660 stored in the memory 110, to an image synthesis function of the electronic device 100 described herein.

The video processor 135 may process image data to be displayed on the display 130, and perform various image processing operations such as decoding, rendering, scaling, noise filtering, frame rate conversion, and resolution conversion on the image data.

The audio processor 145 processes audio data. The audio processor 145 may perform various processing operations such as decoding, amplification, and noise filtering on the audio data.

The audio outputter 140 may output audio data included in a broadcast signal received through a tuner, audio data input through the communicator 150 or the inputter/outputter 180, or audio data stored in the memory 110, under the control of the processor 120. The audio outputter 140 may include at least one of a speaker 141, a headphone output terminal 142, or a Sony/Philips Digital Interface (S/PDIF) output terminal 143.

The user inputter 190 refers to a means used by the user to input data for controlling the electronic device 100. For example, the user inputter 190 may include a keypad, a dome switch, a touchpad, a jog wheel, or a jog switch, but is not limited thereto.

The user inputter 190 according to an embodiment may receive a command for receiving a selection of an input image, receiving a selection of a synthesis region in the input image to be combined with a target object image, or controlling a target object image in a composite image.

In the block diagrams of the electronic device 100 illustrated in FIGS. 3 and 4, the elements illustrated may be integrated, added, or omitted. For example, two or more elements may be combined into one element, or one element may be divided into two or more elements as described in more detail below. Functions performed by the blocks are merely to describe embodiments, and specific operations or devices are not limiting.

Figure 5:
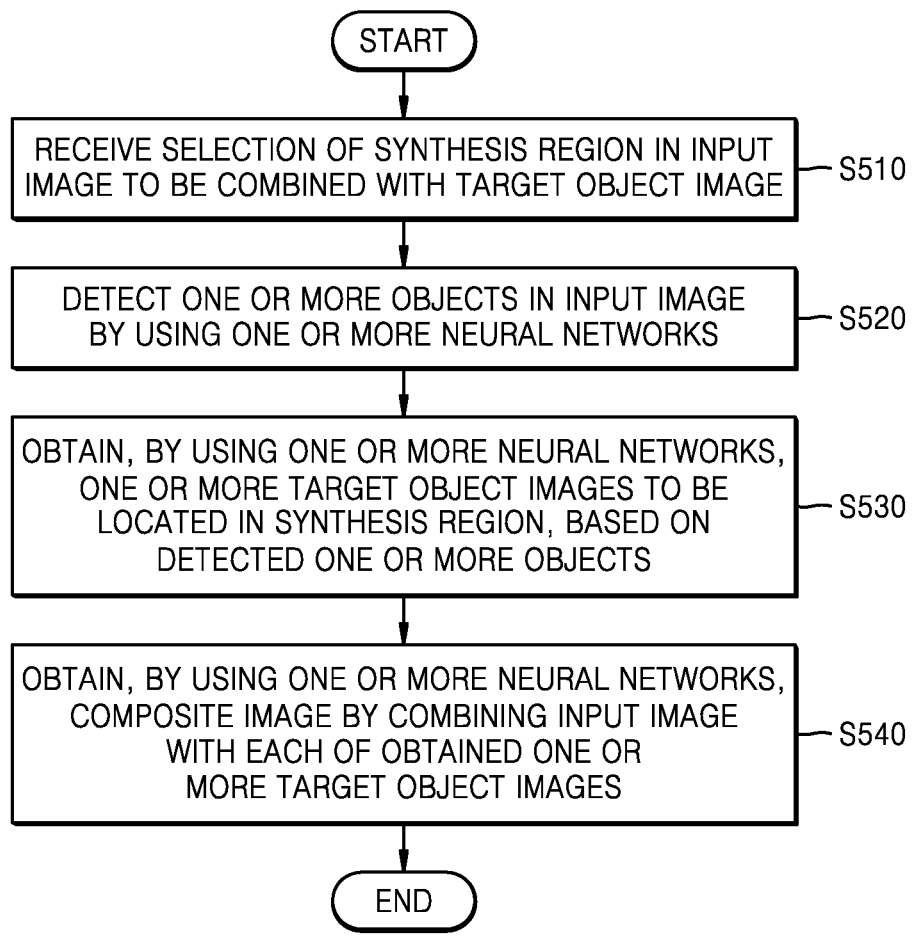
FIG. 5 is a flowchart of an example of an operating method of an electronic device, according to an embodiment.

FIG. 5 is a flowchart of an example of an operating method of the electronic device 100, according to an embodiment.

Referring to FIG. 5, in operation S510, the electronic device 100 may receive a selection of a synthesis region in an input image to be combined with a target object image.

When the electronic device 100 combines two different images, an image serving as a background is called an input image and an image including a target object is called a target object image.

According to an embodiment, the electronic device 100 may receive the input image and receive the selection of the synthesis region in the input image to be combined with the target object image. For example, a user may input a location of a portion of the input image to be combined with the target object image, to the electronic device 100 by using various user interaction means such as touch, a gesture, and a pointer.

In operation S520, the electronic device 100 may detect one or more objects in the input image by using one or more neural networks.

The electronic device 100 may detect the one or more objects different from a background, by extracting features from the input image, classify categories of the detected one or more objects, and obtain location information of the detected objects.

The neural networks used when the electronic device 100 detects the one or more objects in the input image may include, for example, two stage methods such as a faster region-based convolutional neural network (faster R-CNN), a region-based fully convolutional network (R_FCN), and a feature pyramid network (FPN)-FRCN, or single stage methods such as you only look once (YOLO), a single shot MultiBox detector (SSD), and RetinaNet.

In operation S530, the electronic device 100 may obtain images of one or more target objects to be located in the synthesis region, based on the detected one or more objects by using one or more neural networks.

The electronic device 100 may obtain class vectors corresponding to the one or more objects detected in the input image, and obtain class vectors of the one or more target objects to be located in the synthesis region, in consideration of a location of the synthesis region in the input image.

Neural networks used when the electronic device 100 obtains the class vectors of the target objects by using the one or more objects may include, for example, latent semantic analysis (LSA), Word2Vec, GloVe, and fastText.

The electronic device 100 may generate target object images by using the obtained class vectors of the target objects.

Neural networks used when the electronic device 100 generates the target object images by using the class vectors of the target objects may include, for example, a GAN.

In operation S540, the electronic device 100 may obtain a composite image by combining the input image with the obtained one or more target object images by using one or more neural networks.

The neural networks used when the electronic device 100 combines the input image with the obtained one or more target object images may include, for example, U-Net.

Figure 6:
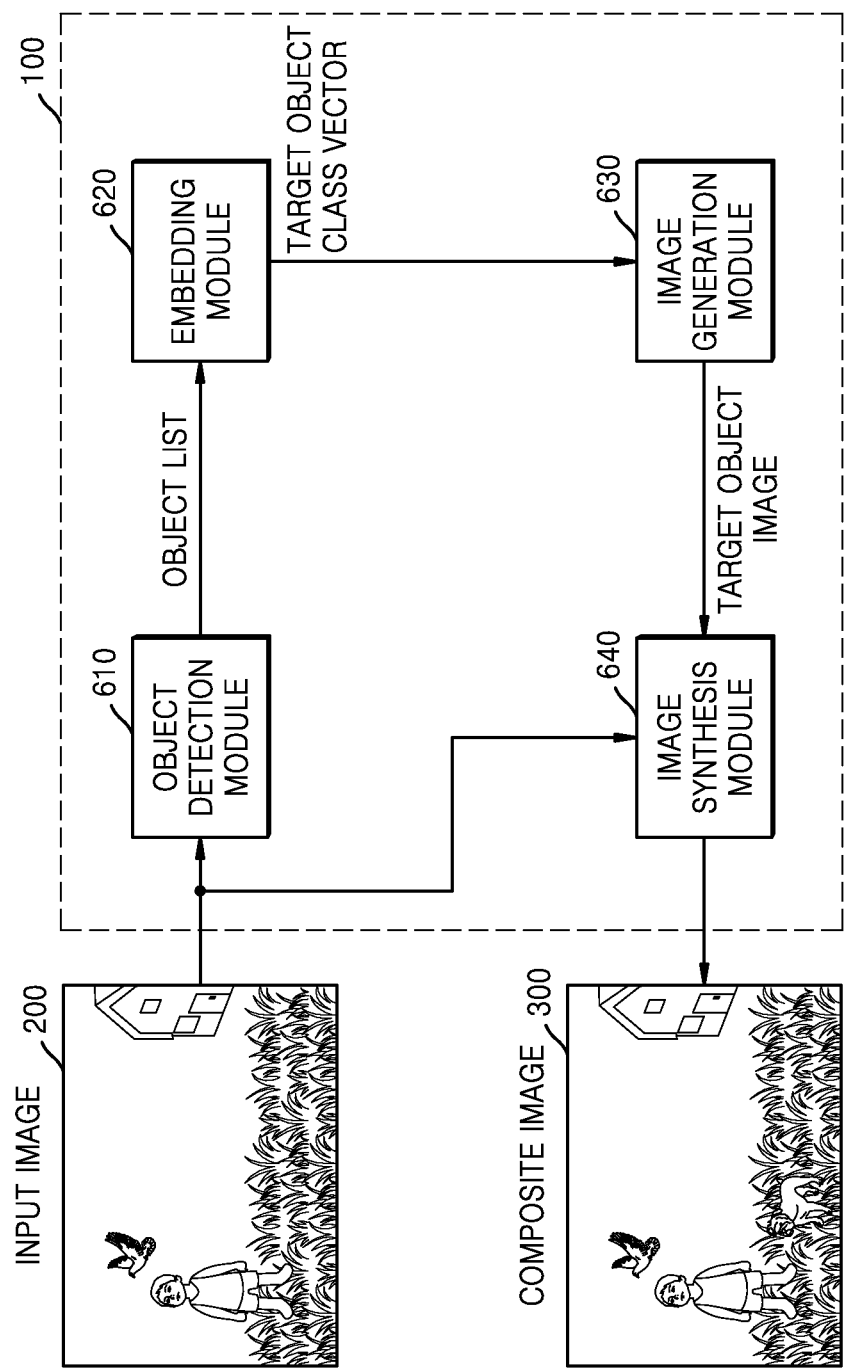
FIG. 6 shows an example configuration of an electronic device for performing operations illustrated in FIG. 5, according to an embodiment.

FIG. 6 shows an example configuration of an electronic device 100 for performing the operations illustrated in FIG. 5, according to an embodiment.

Referring to FIG. 6, the electronic device 100 may include the object detection module 610, the embedding module 620, the image generation module 630, and the image synthesis module 640.

The object detection module 610 may include appropriate logics, circuits, interfaces, and/or codes for detecting one or more objects in the input image 200.

According to an embodiment, the object detection module 610 may receive the input image 200 and location information of a synthesis region in the input image 200 to be combined with a target object image.

According to an embodiment, the object detection module 610 may detect one or more objects in the input image 200 by using one or more neural networks, and provide, to the embedding module 620, an object list including distance information from the synthesis region to the detected objects. The object list may include information on the detected one or more objects, and the information on the one or more objects may include (object class of each object, distance information from synthesis region to each object). For example, when the object detection module 610 detects objects such as a boy, a bird, and a house in the input image 200, the object list may include (boy, 3), (bird, 5), and (house, 20) as (object class, distance information, e.g., measured in appropriate units such as pixels, millimeters, centimeters, etc.).

The embedding module 620 may include appropriate logics, circuits, interfaces, and/or codes for generating class vectors of one or more target objects to be located in the synthesis region of the input image 200, by using the one or more objects included in the object list received from the object detection module 610.

According to an embodiment, the embedding module 620 may receive, from the object detection module 610, the object list including the information on the one or more objects.

According to an embodiment, the embedding module 620 may obtain class vectors corresponding to one or more object classes included in the received object list, by using one or more neural networks, and obtain one or more target object class vectors adjacent to the obtained class vectors, by using the distance information of the one or more objects included in the object list. For example, the embedding module 620 may output fifteen class vectors corresponding to a dog and three class vectors corresponding to a cat, as the target object class vectors obtained using the object list received from the object detection module 610, e.g., (boy, 3), (bird, 5), and (house, 20).

The image generation module 630 may include appropriate logics, circuits, interfaces, and/or codes for generating one or more target object images corresponding to the one or more target object class vectors received from the embedding module 620.

According to an embodiment, the image generation module 630 may generate the target object images corresponding to the one or more target object class vectors received from the embedding module 620, by using one or more neural networks. For example, the image generation module 630 may generate fifteen dog images and three cat images by using the fifteen class vectors corresponding to a dog and the three class vectors corresponding to a cat, which are received from the embedding module 620.

The image synthesis module 640 may include appropriate logics, circuits, interfaces, and/or codes for combining the input image 200 with the target object images received from the image generation module 630.

According to an embodiment, the image synthesis module 640 may output a composite image generated by combining the input image 200 with the target object images received from the image generation module 630, by using one or more neural networks. For example, the image synthesis module 640 may generate the composite image 300 by combining the input image 200 with each of the fifteen dog images and the three cat images received from the image generation module 630.

Figure 7:
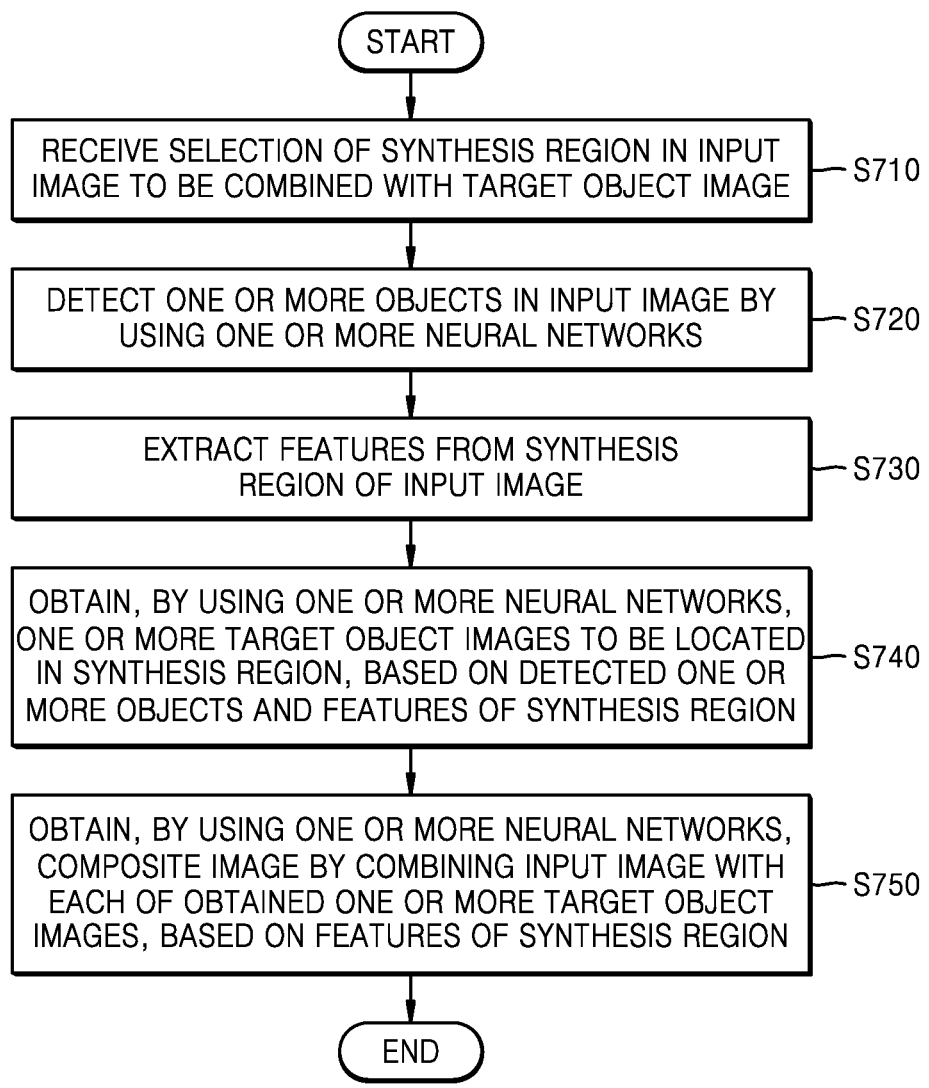
FIG. 7 is a flowchart of an example of an operating method of an electronic device, according to an embodiment.

FIG. 7 is a flowchart of an example of an operating method of the electronic device 100, according to an embodiment.

The descriptions provided above in relation to FIG. 5 will be provided in brief herein to describe operations of FIG. 7.

Referring to FIG. 7, in operation S710, the electronic device 100 may receive a selection of a synthesis region in an input image to be combined with a target object image.

In operation S720, the electronic device 100 may detect one or more objects in the input image by using one or more neural networks.

In operation S730, the electronic device 100 may extract image features from the synthesis region of the input image by using one or more neural networks.

The neural networks used when the electronic device 100 extracts the image features from the synthesis region of the input image may include, for example, CNNs.

In operation S740, the electronic device 100 may obtain one or more target object images to be located in the synthesis region by reflecting the features of the synthesis region, based on the detected one or more objects by using one or more neural networks.

The electronic device 100 may obtain class vectors corresponding to the one or more objects detected in the input image, and obtain one or more target object class vectors to be located in the synthesis region, in consideration of a location of the synthesis region in the input image.

The electronic device 100 may generate target object images by using the obtained target object class vectors and, in this case, the target object images more appropriate for the synthesis region may be generated by reflecting the features of synthesis region.

Neural networks used when the electronic device 100 generates the target object images by using the target object class vectors may include, for example, conditional GANs.

In operation S750, the electronic device 100 may obtain a composite image by combining the input image with the obtained one or more target object images, based on the features of the synthesis region by using one or more neural networks.

The electronic device 100 may obtain the composite image having a natural boundary between a target object and the input image, by reflecting the features of the synthesis region to combine the input image with the one or more target object images.

Figure 8:
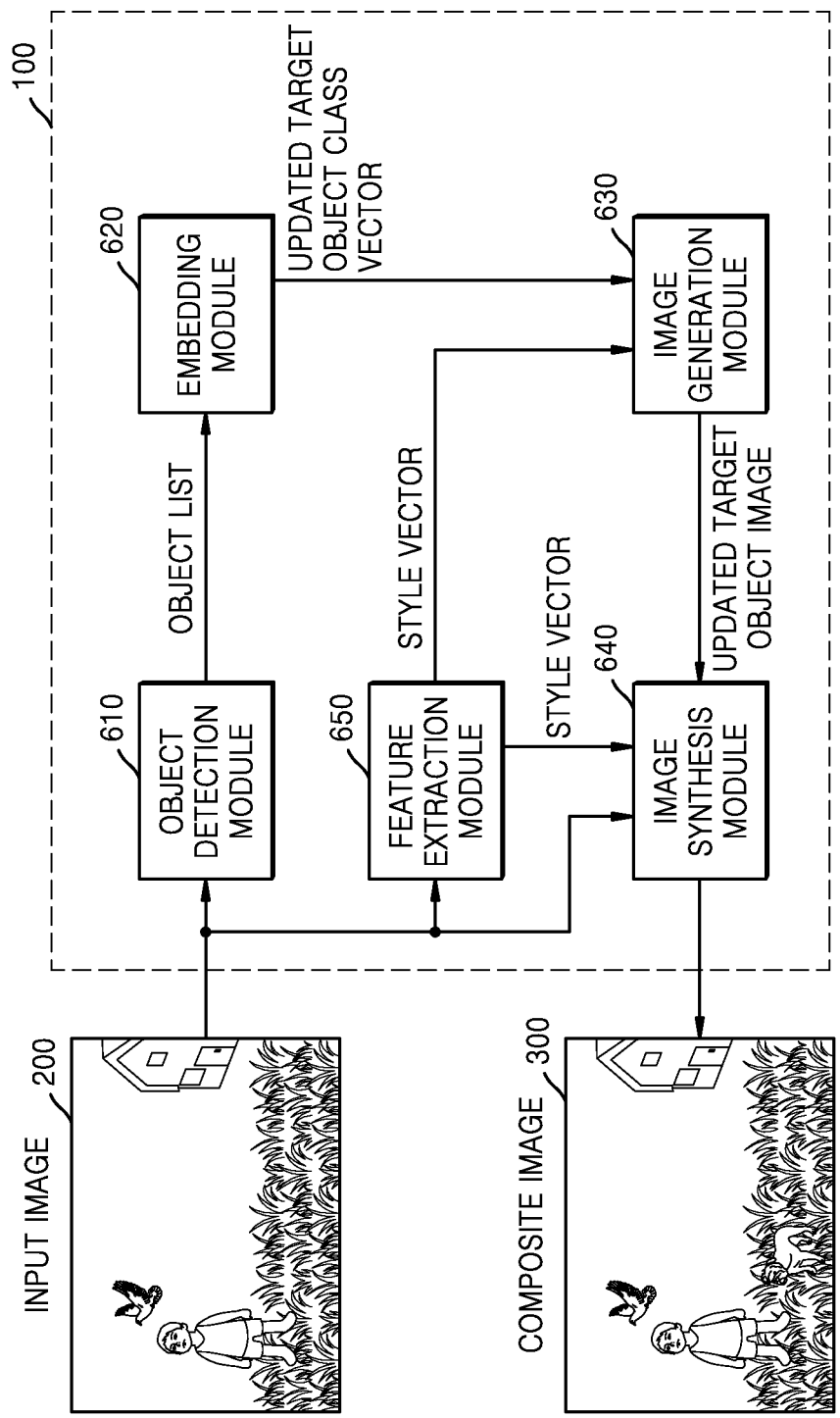
FIG. 8 shows an example configuration of an electronic device for performing operations illustrated in FIG. 7, according to an embodiment.

FIG. 8 shows an example configuration of an electronic device 100 for performing the operations illustrated in FIG. 7, according to an embodiment.

Referring to FIG. 8, in addition to the object detection module 610, the embedding module 620, the image generation module 630, and the image synthesis module 640, the electronic device 100 may further include the feature extraction module 650.

The descriptions of the object detection module 610 and the embedding module 620 are provided above in relation to FIG. 6 and will not be repeated herein.

The feature extraction module 650 may include appropriate logics, circuits, interfaces, and/or codes for receiving a synthesis region of the input image 200 and extracting features from the synthesis region of the input image 200.

According to an embodiment, the feature extraction module 650 may extract one or more features from the synthesis region of the input image 200 by using one or more neural networks. The one or more features may include an image color or texture. The feature extraction module 650 may configure a style vector by using the extracted features of the synthesis region and provide the configured style vector to at least one of the image generation module 630 or the image synthesis module 640.

The image generation module 630 may include appropriate logics, circuits, interfaces, and/or codes for reflecting the style vector corresponding to the features of the synthesis region to generate one or more target object images corresponding to one or more target object class vectors received from the embedding module 620.

According to an embodiment, the image generation module 630 may reflect the features of the synthesis region to generate the target object images corresponding to the one or more target object class vectors received from the embedding module 620, by using one or more neural networks. For example, the image generation module 630 may generate fifteen dog images and three cat images by using fifteen class vectors corresponding to a dog and three class vectors corresponding to a cat, which are received from the embedding module 620, and, in this case, the dog images and the cat images may be generated by reflecting image features, e.g., image color or texture information, of the synthesis region.

The image synthesis module 640 may include appropriate logics, circuits, interfaces, and/or codes for reflecting the style vector corresponding to the features of the synthesis region, to combine the input image 200 with the one or more target object images received from the image generation module 630.

According to an embodiment, the image synthesis module 640 may combine the input image 200 with the one or more target object images received from the image generation module 630, by reflecting the image features of the synthesis region by using one or more neural networks. For example, the image synthesis module 640 may naturally process edges of a dog or a cat in consideration of the image features of the synthesis region, e.g., a color or texture of the synthesis region, to combine the input image 200 with each of the fifteen dog images and the three cat images received from the image generation module 630.

Figure 9:
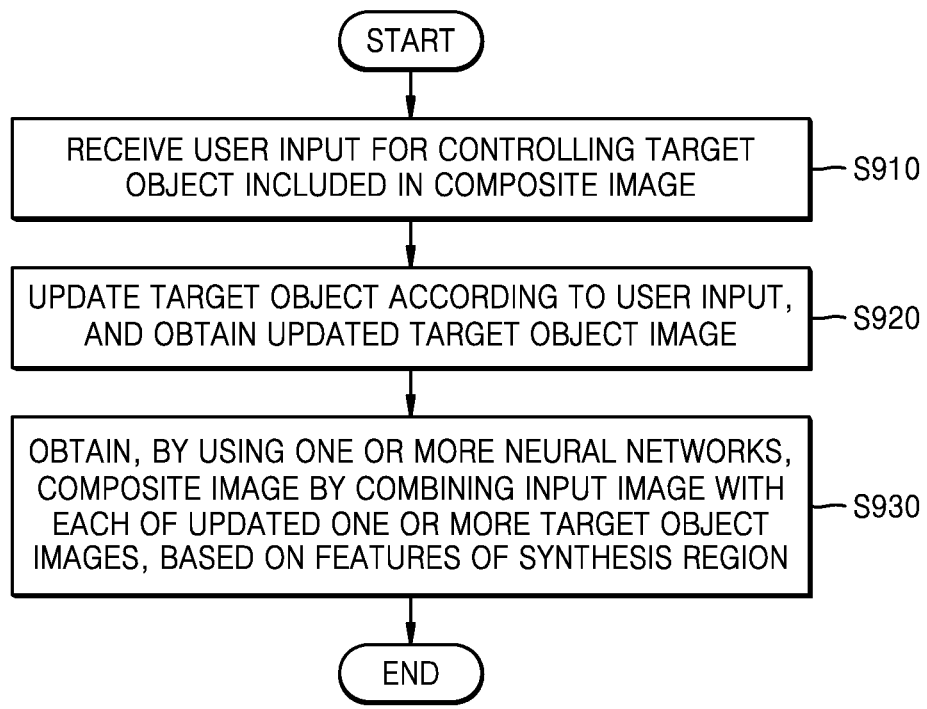
FIG. 9 is a flowchart of an example of an operating method of an electronic device, according to an embodiment.

FIG. 9 is a flowchart of an example of an operating method of the electronic device 100, according to an embodiment.

Referring to FIG. 9, in operation S910, the electronic device 100 may receive a user input for controlling a target object included in a composite image.

In operation S920, the electronic device 100 may update the target object according to the user input, and obtain an image of the updated target object.

The electronic device 100 may obtain a class vector adjacent to a class vector of the target object currently included in the composite image, to update the target object, and generate a target object image corresponding to the class vector of the updated target object. For example, when a Poodle class vector is obtained as a class vector adjacent to a <Bulldog> class vector, the electronic device 100 may obtain an image corresponding to a Poodle.

In operation S930, the electronic device 100 may obtain a composite image by combining an input image with the updated target object image by using one or more neural networks. For example, the electronic device 100 may output a composite image generated by combining the input image with a Poodle image corresponding to the updated target object image.

Figure 10:
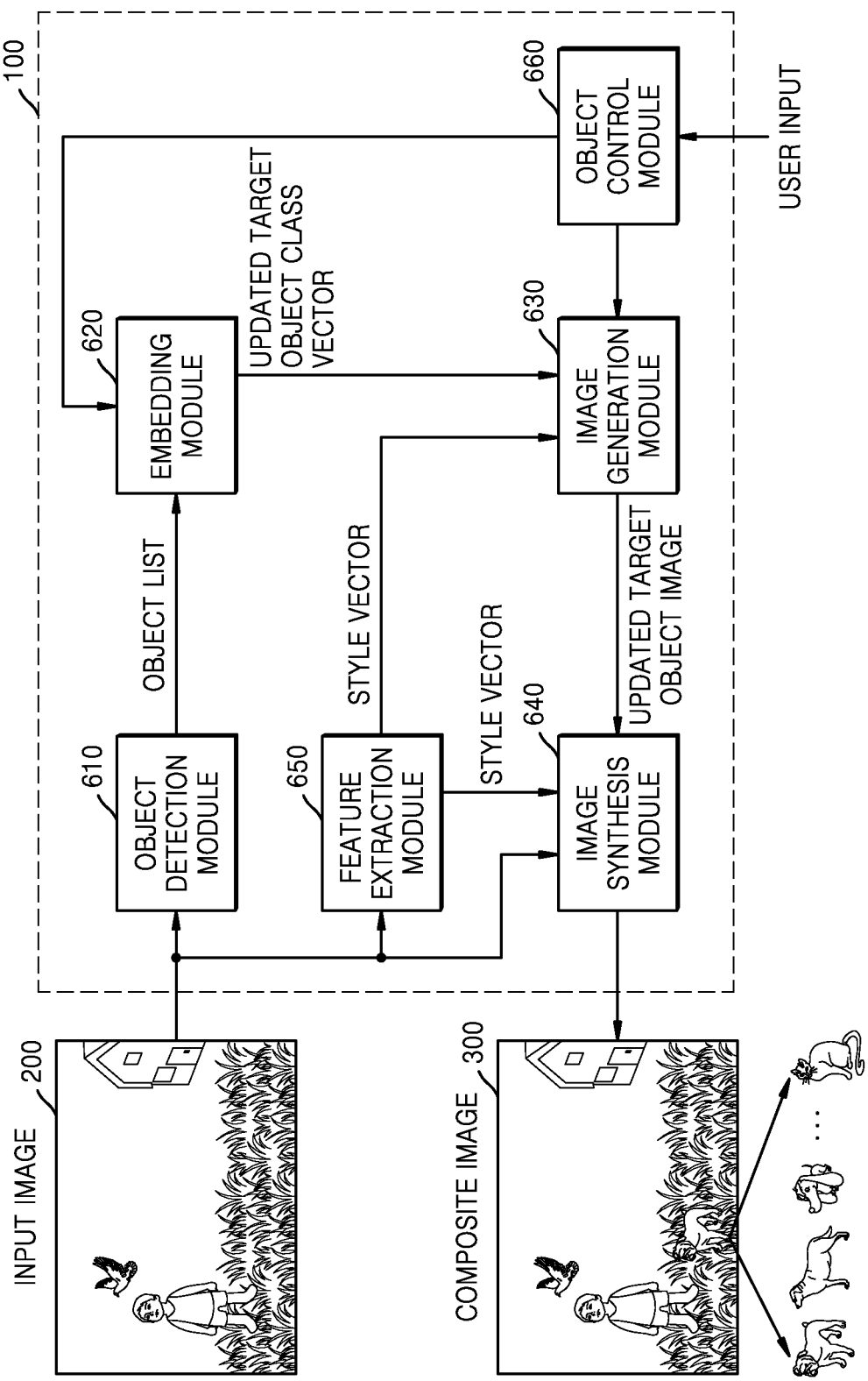
FIG. 10 shows an example configuration of an electronic device for performing operations illustrated in FIG. 9, according to an embodiment.

FIG. 10 shows an example configuration of an electronic device 100 for performing the operations illustrated in FIG. 9, according to an embodiment.

Referring to FIG. 10, in addition to the object detection module 610, the embedding module 620, the image generation module 630, the image synthesis module 640, and the feature extraction module 650, the electronic device 100 may further include the object control module 660.

The object detection module 610, the embedding module 620, the image generation module 630, the image synthesis module 640, and the feature extraction module 650 are substantially the same as described above, and the redundant descriptions will be omitted.

The object control module 660 may include appropriate logics, circuits, interfaces, and/or codes for receiving a user input for instructing to update a target object in a composite image (i.e., a target object control command), and controlling the embedding module 620 and the image generation module 630 according to the target object control command.

According to an embodiment, the object control module 660 may instruct the embedding module 620 to generate a class vector of a target object adjacent to a class vector of the target object currently included in the composite image. For example, when the electronic device 100 outputs a composite image generated by combining an input image with a <Bulldog> image as a target object image, a user may desire a dog of another species than a <Bulldog> as the target object. In this case, the object control module 660 may receive, from the user, a control command for changing or updating the target object in the composite image.

The embedding module 620 may generate a target object class vector adjacent to a class vector of the target object currently included in the composite image, and transmit the generated target object class vector to the image generation module 630 under the control of the object control module 660. For example, the embedding module 620 may obtain a Poodle class vector as a class vector adjacent to a <Bulldog> class vector and transmit the Poodle class vector to the image generation module 630.

The image generation module 630 may generate an updated target object image corresponding to the updated target object class vector received from the embedding module 620. For example, the image generation module 630 may generate a <Bulldog> image corresponding to the <Bulldog> class vector, as the updated target object image.

The image synthesis module 640 may generate a composite image by combining the input image with the updated target object image received from the image generation module 630. For example, the image synthesis module 640 may output a composite image generated by combining the input image with the <Bulldog> image as the updated target object image.

Each module of an electronic device will now be described in detail with reference to FIGS. 11 to 32.

Object Detection Module

Figure 11:
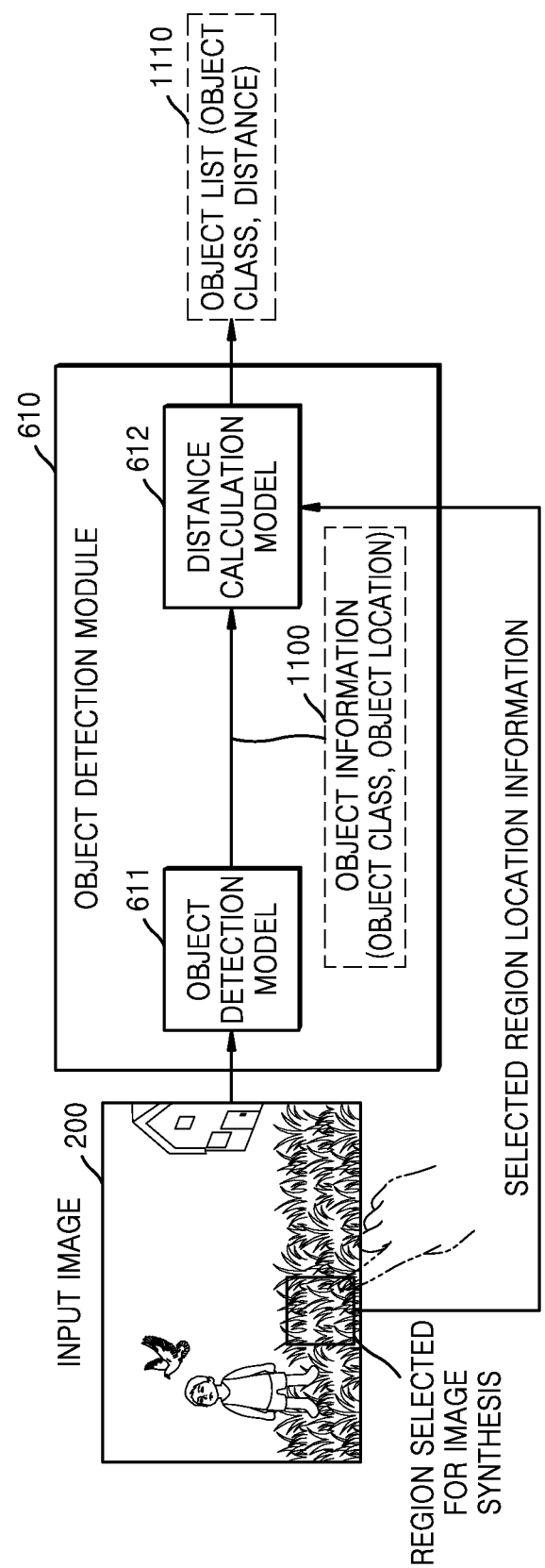
FIG. 11 is a block diagram of an example of an object detection module according to an embodiment.

FIG. 11 is a block diagram of an example of the object detection module 610 according to an embodiment.

Referring to FIG. 11, the object detection module 610 includes an object detection model 611 and a distance calculation module 612.

The object detection model 611 may detect one or more objects in the input image 200 by using one or more neural networks, and output object information 1100 including object classes and object locations corresponding to the detected one or more objects.

Object detection includes object localization for determining locations of objects in a given image, and object classification for determining classes to which the one or more objects belong. Therefore, the object detection model 611 may include three stages, i.e., informative region selection for selecting informative regions, feature extraction for extracting features from each informative region, and classification for classifying each informative region by applying a classifier to the extracted features. Localization performance may be increased through post-processing such as bounding-box regression according to a detection method.

An example of an object detection model will now be described with reference to FIG. 12.

Figure 12:
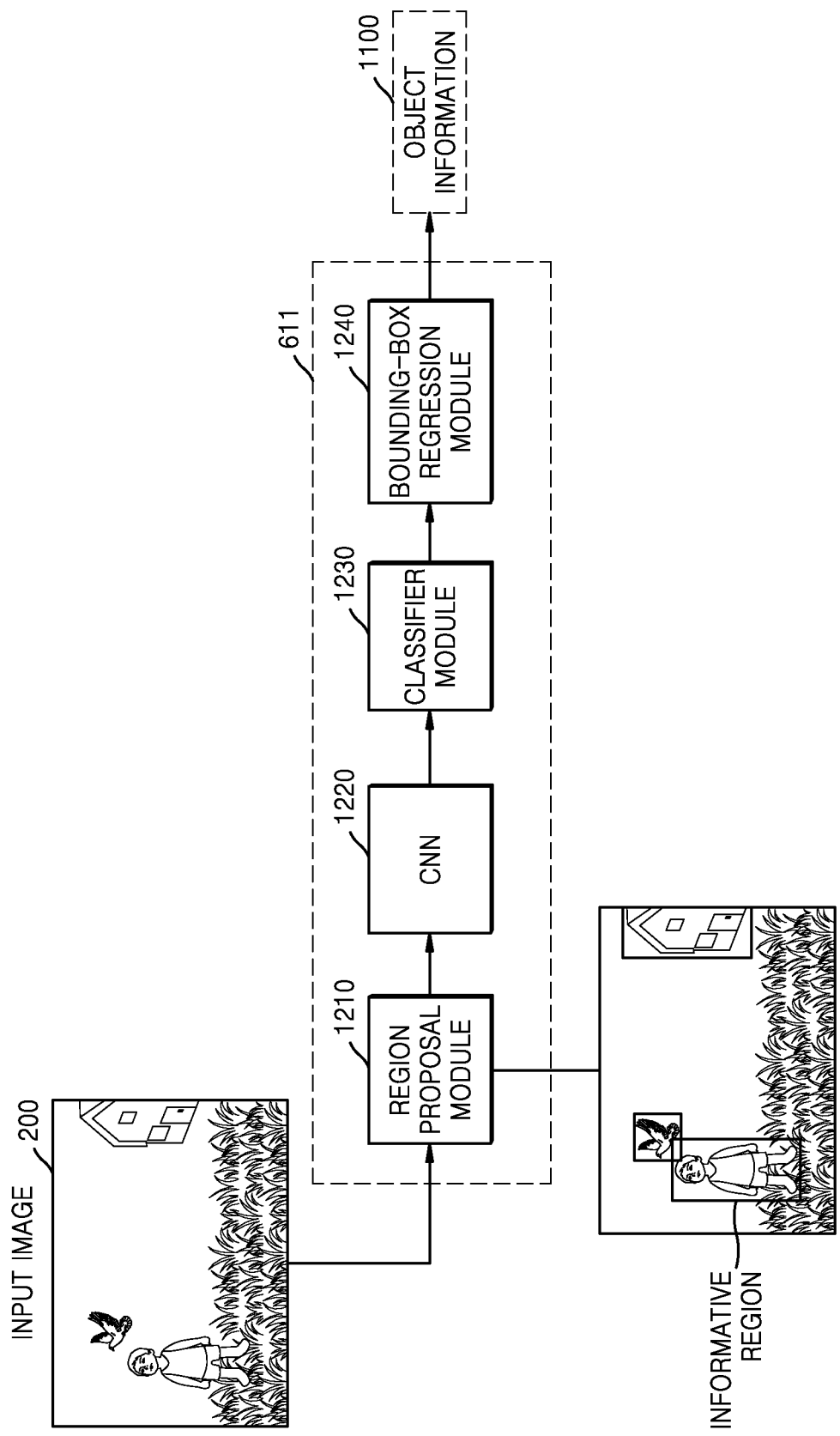
FIG. 12 shows a network architecture of a region-based convolutional neural network (R-CNN) as an object detection method using a combination of region proposal and a CNN, according to an embodiment.

FIG. 12 shows a network architecture of an R-CNN as an object detection method using a combination of region proposal and a CNN, according to an embodiment.

Referring to FIG. 12, an object detection model 611 may include a region proposal module 1210, a CNN 1220, a classifier module 1230, and a bounding-box regression module 1240.

The region proposal module 1210 extracts informative regions from the input image 200. A certain number of informative regions, e.g., 2,000 informative regions, may be extracted. The R-CNN uses selective-search as one of region proposal algorithms.

The CNN 1220 extracts fixed-length feature vectors from the regions generated by the region proposal module 1210. The CNN 1220 (e.g., AlexNet or VGGNet) receives certain-sized inputs and thus various rectangular image regions given by the region proposal algorithm need to be warped to the certain size regardless of sizes and aspect ratios thereof. The CNN 1220 receives the warped region and extracts a result of a layer before the classifier module 1230.

The classifier module 1230 receives the fixed-length feature vector as an input and performs classification.

The bounding-box regression module 1240 receives the fixed-length feature vector as an input and calculates four coordinates (x, y, w, h) representing a box. A location of an object may be specified by the four coordinates (x, y, w, h) representing a box.

That is, the R-CNN performs object detection by performing object localization through region proposal extraction and performing object classification using extracted features. Bounding-box regression may be performed to reduce localization errors.

To train the object detection model 611, a classification layer (e.g., an output layer) of a pre-trained CNN is newly changed to "the number of object classes+a background" for object detection and weight initialization is performed only at corresponding parts in order to modify the pre-trained CNN appropriately for object detection.

To train a linear support-vector machine (SVM) per class, when positive samples (regions for which final result values of objects per class are output to be equal to or greater than a certain threshold from among the regions generated by the region proposal algorithm) and negative samples (regions for which final result values of objects per class are output to be less than the certain threshold from among the regions generated by the region proposal algorithm) are selected per class and the positive and negative samples are configured for a linear SVM per class to be trained, fixed-length feature vectors are extracted using a fine-tuned CNN and the linear SVM per class may be trained using the fixed-length feature vectors as inputs.

For example, one or more objects may be detected in the input image 200 by the above-described object detection model 611. The object information 1100 includes information on the one or more objects, and the information on each object may be represented as (object class, location).

FIG. 12 merely illustrates an example for implementing an object detection module, and the object detection module may be implemented in a simpler configuration.

Figure 13:
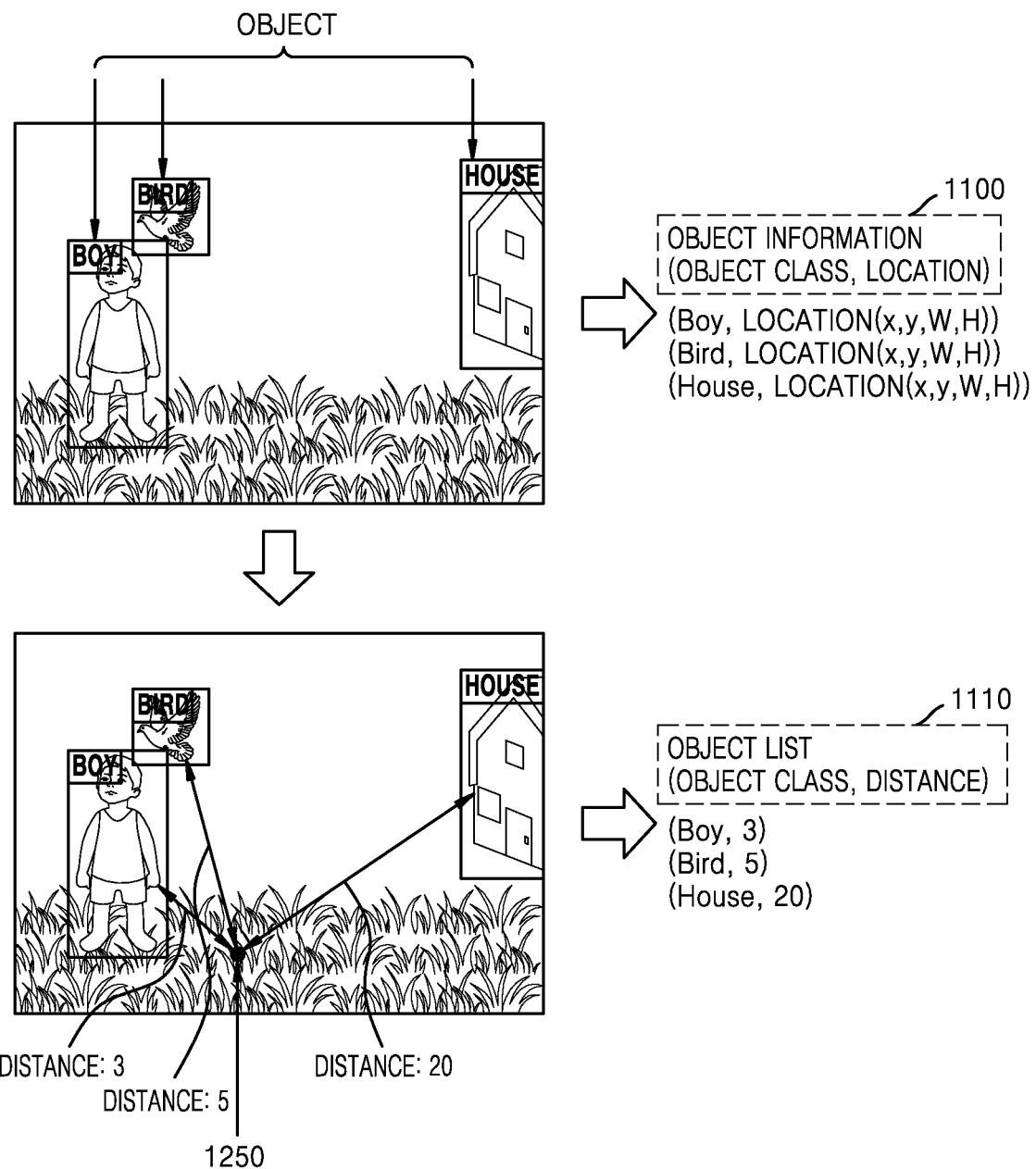
FIG. 13 shows an example of object information and an object list illustrated in FIG. 11, according to an embodiment.

FIG. 13 shows an example of the object information 1100 and an object list 1110 illustrated in FIG. 11, according to an embodiment.

Referring to FIG. 13, the object detection module 610 may detect, for example, three objects in the input image 200 and output (Boy, Location of Boy), (Bird, Location of Bird), and (House, Location of House) as the object information 1100.

Referring back to FIG. 11, the distance calculation module 612 may receive the object information 1100 (i.e., (object class, object location)) from the object detection model 611, calculate a distance from each object to the synthesis region, e.g., a center point 1250, by using location information of the synthesis region in the input image 200 to be combined with a target object image, and output (object class, distance from each object to synthesis region) as the object list 1110.

Referring to FIG. 13, for example, the distance calculation module 612 may calculate a distance from the boy to the synthesis region to be 3, calculate a distance from the bird to the synthesis region to be 5, and calculate a distance from the house to the synthesis region to be 20. Therefore, the distance calculation module 612 may output (Boy, 3), (Bird, 5), and (House, 20) as the object list 1110.

Embedding Module

Figure 14:
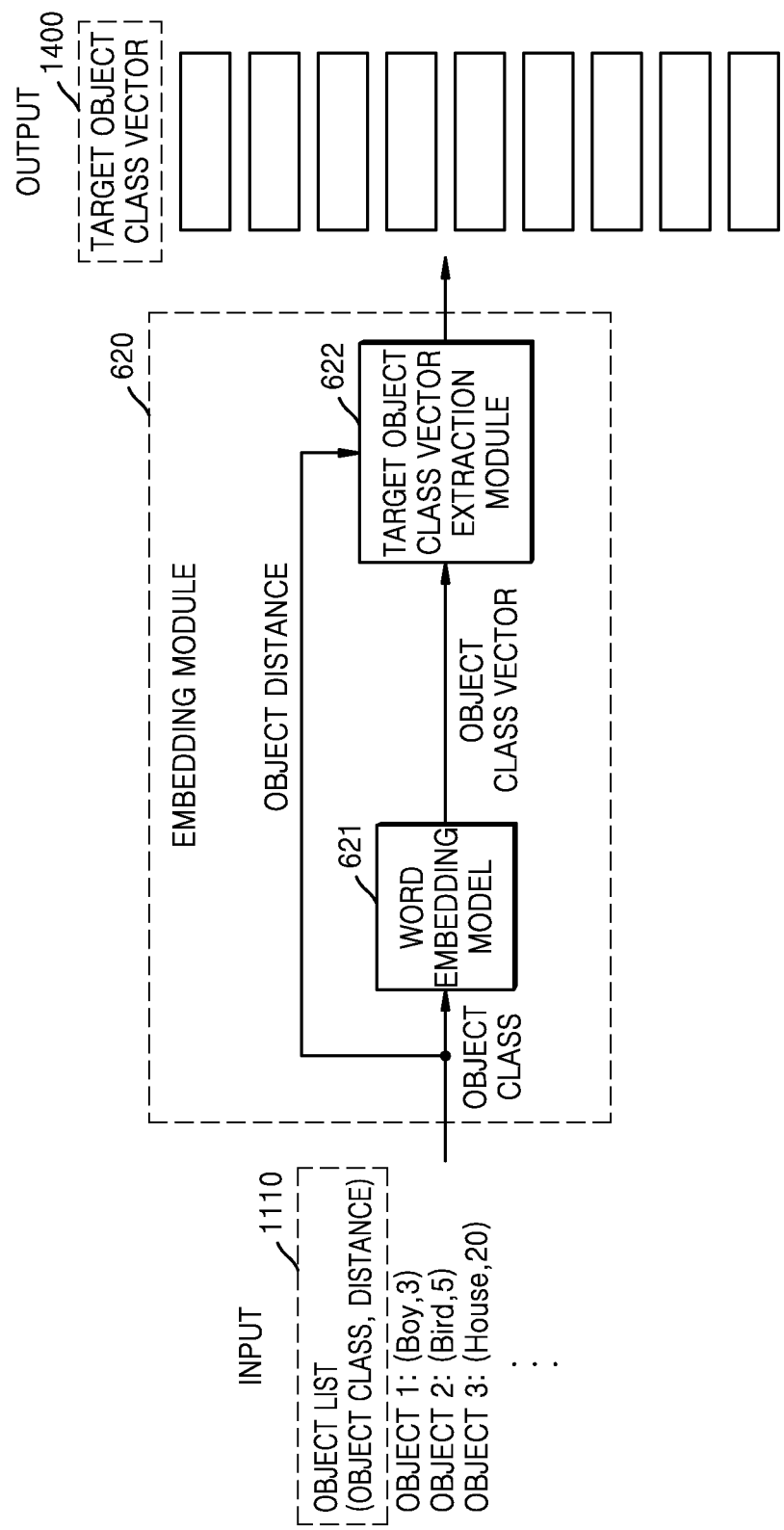
FIG. 14 shows an example of an embedding module according to an embodiment.

FIG. 14 shows an example of the embedding module 620 according to an embodiment.

The embedding module 620 receives the object list 1110 from the object detection module 610 and obtains one or more target object class vectors 1400, based on one or more object classes included in the object list 1110.

Referring to FIG. 14, the embedding module 620 may include a word embedding model 621 and a target object class vector extraction module 622.

The word embedding model 621 receives one or more object classes included in the object list 1110 received from the object detection module 610, and maps the object classes to object class vectors by using one or more neural networks.

The word embedding model 621 is trained based on a vector of each word by mapping semantically similar words to close points.

$W(\text{"cat"}) = (0.2, -0.4, 0.7, \ldots)$ $W(\text{"mat"}) = (0.0, 0.6, -0.1, \ldots)$ For example, the word embedding model 621 converts a word such as cat or mat into a certain-dimensional vector. A matrix "W" is used to convert a word into a vector. Due to the conversion through the matrix, a word is changed into a meaningful vector. Two similar words may be converted into similar vectors, and the matrix W may be obtained through training. For example, in a set of 5,000 words, each word may be represented as [0, 0, 0, 1, 0, . . . , 0, 0, 0] (5,000 columns). In this case, when each word is to be represented as a 32-dimensional vector through word embedding, the dimension of the matrix W is 5,000*32. A 32-dimensional vector such as [0.2, 0, 4, 0.5, . . . , 0.8, 8] is obtained through training.

Figure 15:
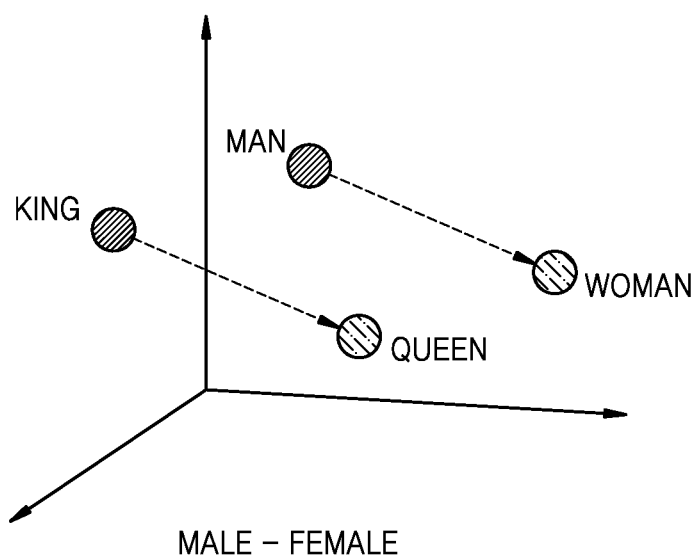
FIG. 15 shows an example of word embedding according to an embodiment.

FIG. 15 shows an example of word embedding according to an embodiment. Referring to FIG. 15, king and queen, king and man, or queen and woman are in the same direction. Words of similar meanings are located in the similar direction. Word embedding effectively represents meanings of words and thus may increase the performance of training compared to one-hot encoding. In addition, when word embedding is pre-trained with a large amount of data, a relatively high performance may be achieved with less data by using the trained embedding in a task such as document classification. Types of word embedding include, for example, LSA, Word2Vec, GloVe, and fastText.

As a type of word embedding, Word2Vec is a model obtained by modifying a previous neural network language model (NNLM) to enable efficient training. A language model refers to a model for predicting a next word based on previously given words. Training is enabled using only text without a label, e.g., classification. The Word2Vec creates word embedding by using byproducts of training this language model.

The Word2Vec includes two methods such as CBOW and Skip-Gram. The CBOW predicts a target word by adding embedding of surrounding words, and the Skip-Gram predicts surrounding words by embedding a target word.

Figure 16:
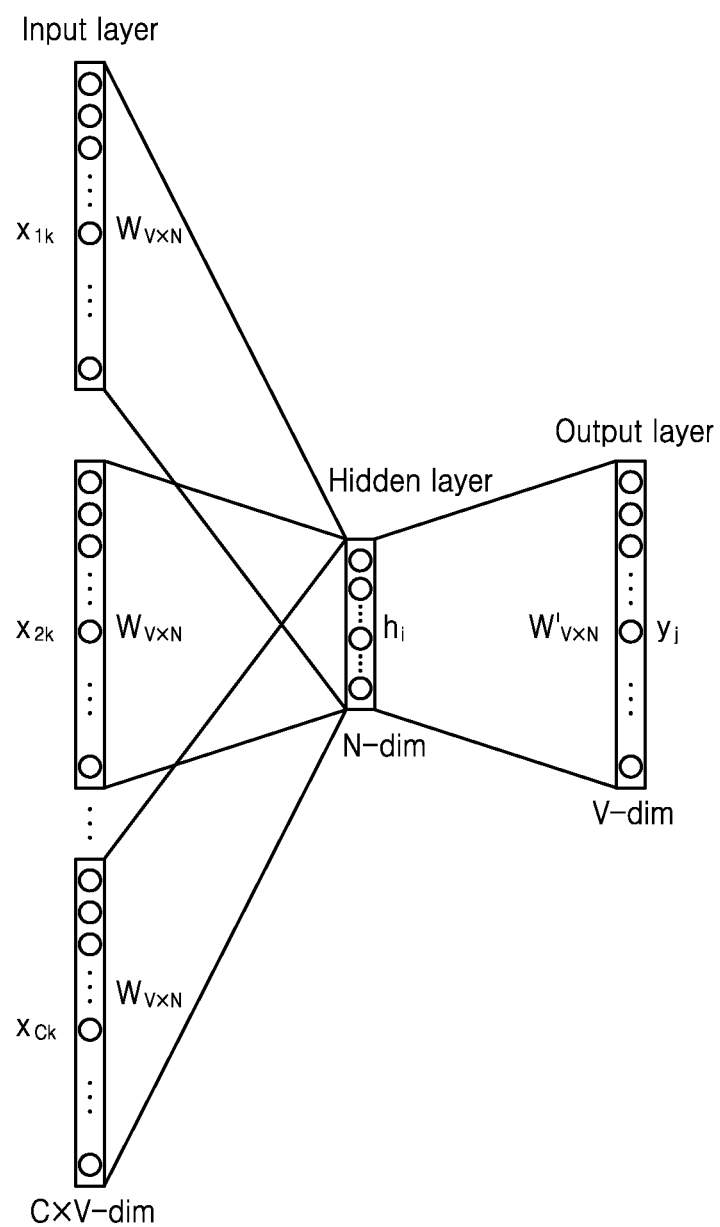
FIG. 16 shows an example of a continuous bag-of-words (CBOW) method of Word2Vec according to an embodiment.

FIG. 16 shows an example of a CBOW method of Word2Vec according to an embodiment.

Referring to FIG. 16, initially, an input layer converts all words of a sentence to be trained, into vectors by using one-hot encoding. 2 m word vectors are given as input values for one center word.

Parameters include a parameter matrix W ($W \in R$ V×N) between the input layer and a hidden layer, and a parameter matrix W' ($W' \in R$ V×N) between the hidden layer and an output layer.

The purpose of this model is to maximize a conditional probability of a center word when surrounding words are given.

The word vectors of the input layer according to one-hot encoding will be multiplied by the parameter W into embedded word vectors.

The hidden layer calculates an average of the 2 m embedded vectors. The number of neurons of this hidden layer is less than that of the input space and thus a neural network is trained with information of the input layer in a compressed form. This neural network creates a hidden layer having a weight matrix of [the number of words x the number of neurons]. For example, when a whole set of words includes 20,000 unique words and the hidden layer includes 300 neurons, the weight matrix of the hidden layer may have a size of 20,000×300. Once this weight matrix is stored, a vector having 300 elements usable to represent each word is obtained.

To calculate score values to be transmitted from the hidden layer to the output layer, a score for each word is obtained by multiplying the parameter W'. Words at close locations have higher score values.

Lastly, the output layer calculates each score value as a probability value by using softmax.

For training with these parameters, when a word to be predicted is accurately predicted, an objective function by which a value of H becomes 0 may be defined and training may be performed in a direction for minimizing the value of the objective function.

When training of the word embedding neural network is completed, the weights of a single hidden layer of the neural network serve as a lookup table for word embedding. After training is completed with all sentences, each row of the matrix W may be used as an embedding vector of each word.

The word embedding model 621 may configure a word embedding lookup table by using embedding vectors of words which are obtained by training a language model for predicting a next word based on previously given words.

Figure 17:
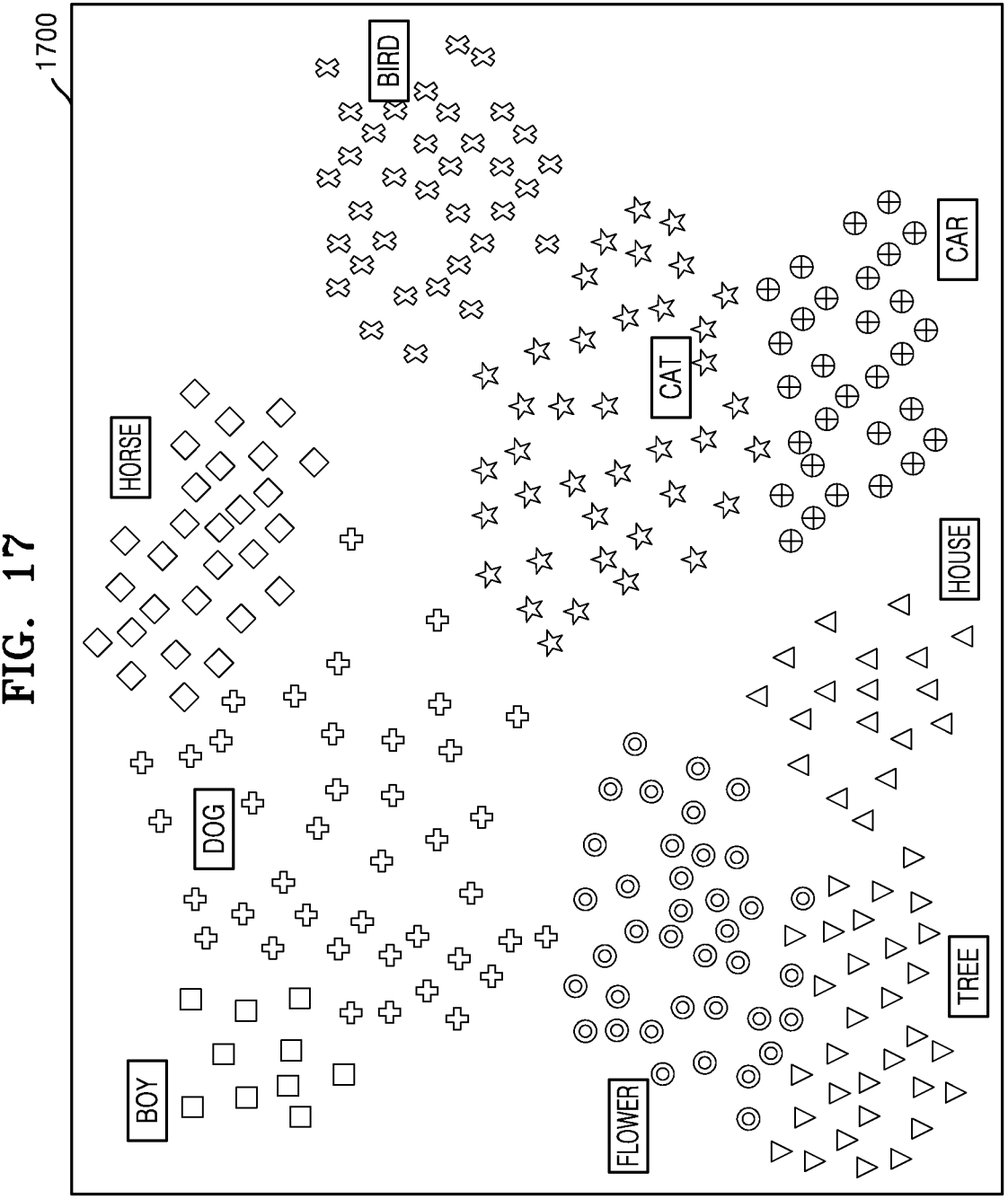
FIG. 17 is a view illustrating a word embedding lookup table according to an embodiment.

FIG. 17 is a view illustrating a word embedding lookup table 1700 obtained by training the word embedding model 621, according to an embodiment.

Referring to FIG. 17, the word embedding lookup table 1700 is a vector space corresponding to words. Therefore, an object class vector corresponding to each object class may be obtained using the word embedding lookup table 1700 obtained after training is completed. It is shown that each symbol is mapped to one class and that, for example, a distance between a dog and a cat is less than a distance between a dog and a car in the vector space because a relationship between a dog and a cat is closer than a relationship between a dog and a car. Referring to FIG. 17, for example, a dog class may include various types of dogs. For example, the dog class may include various types of dogs such as Chihuahua, Yorkshire Terrier, Poodle, Dachshund, Maltese, and Beagle. In the dog class, dogs in a semantically close relationship may be located close to each other and dogs in a semantically distant relationship may be located far from each other.

When an object list includes a boy, a bird, and a house as object classes, the word embedding model 621 may obtain a class vector corresponding to the boy, a class vector corresponding to the bird, and a class vector corresponding to the house, by using the word embedding lookup table 1700, and provide the class vectors to the target object class vector extraction module 622.

Then, the target object class vector extraction module 622 may obtain target object class vectors by using the class vectors and distances of one or more objects, which are received from the word embedding model 621, with reference to the word embedding lookup table 1700 configured by the word embedding model 621. That is, the target object class vector extraction module 622 may determine information on a target object to be located in a synthesis region of an input image, by using objects detected in the input image, e.g., a boy, a bird, and a house. For example, when the detected objects include a boy, a bird, and a house, an appropriate target object to be located adjacent to the objects may include an animal such as a dog or a cat, or a plant such as a tree or a flower(s).

Figure 18:
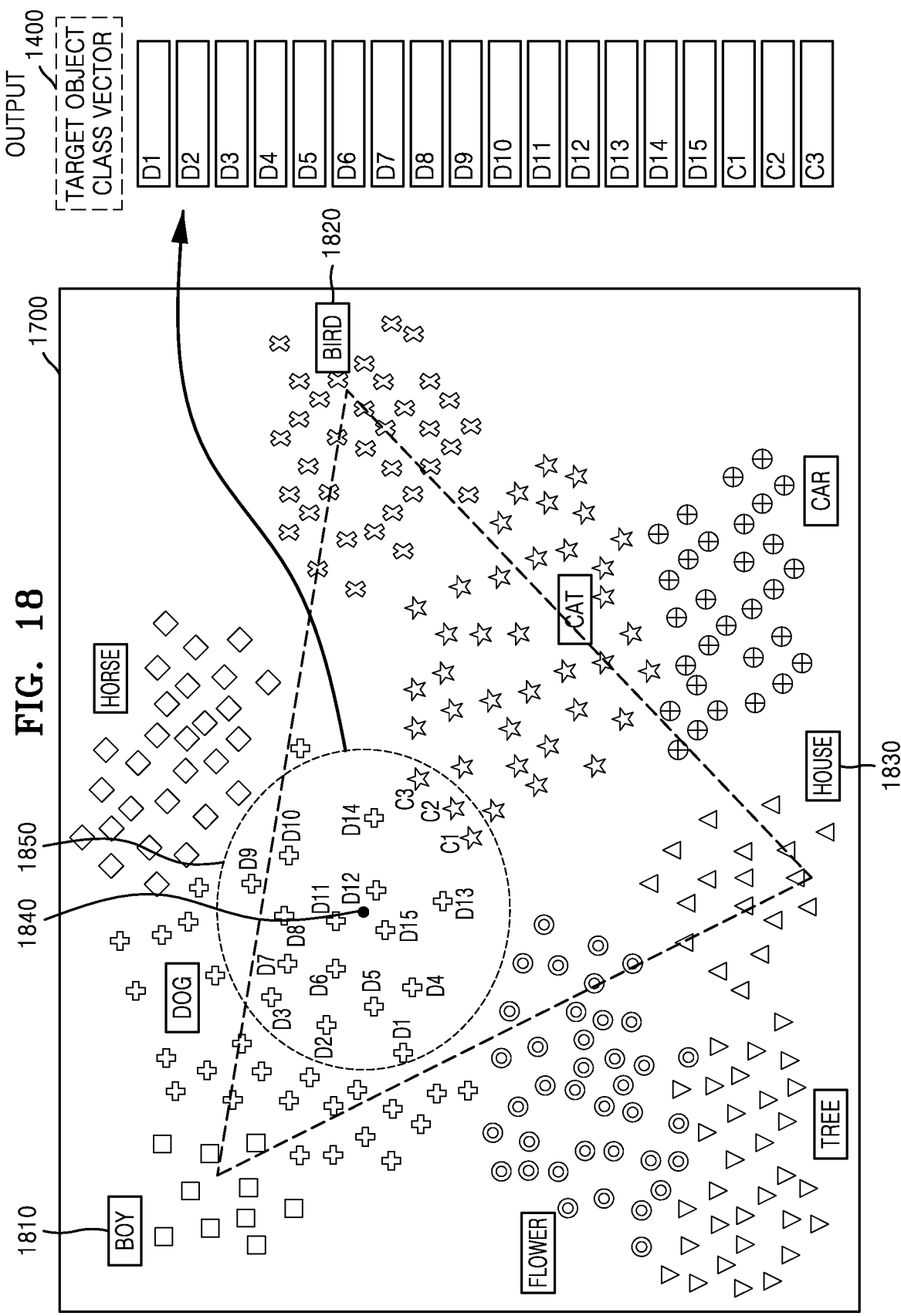
FIG. 18 shows an example of a method used by a target object class vector extraction module to obtain target object class vectors with reference to a word embedding lookup table, according to an embodiment.

FIG. 18 shows an example of a method used by the target object class vector extraction module 622 to obtain target object class vectors 1400 with reference to the word embedding lookup table 1700, according to an embodiment.

Referring to FIG. 18, the target object class vector extraction module 622 finds, in the word embedding lookup table 1700, a class vector corresponding to a boy 1810, a class vector corresponding to a bird 1820, and a class vector corresponding to a house 1830. Because a distance from a synthesis region to a boy object is 3, a distance from the synthesis region to a bird object is 5, and a distance from the synthesis region to a house object is 20 in an input image, target objects may be determined in consideration of the distances from the synthesis region to the objects. For example, a higher weight may be allocated to the boy, which is the closest object to the synthesis region, and a lower weight may be allocated to the house, which is the farthest object from the synthesis region. As described above, a center point 1840 may be found in consideration of the distances from the synthesis region. After that, the target object class vector extraction module 622 may determine, as the target object class vectors 1400, class vectors within a certain range 1850, i.e., a certain distance from the center point 1840.

For example, referring to FIG. 18, the class vectors within the certain distance (e.g., a certain range 1850) from the center point 1840 include D1 to D15 and C1 to C3. D1 to D15 are class vectors indicating various dogs belonging to a dog class, and C1 to C3 are class vectors indicating various cats belonging to a cat class. For example, D1 to D15 may be class vectors corresponding to dog species, e.g., Bulldog, Chihuahua, Yorkshire Terrier, Poodle, Dachshund, Maltese, and Beagle, and C1 to C3 may be class vectors corresponding to cat species, e.g., Persian, American Shorthair, and Siamese. As described above, the target object class vector extraction module 622 may output D1 to D15 and C1 to C3 as the target object class vectors 1400.

Figure 19:
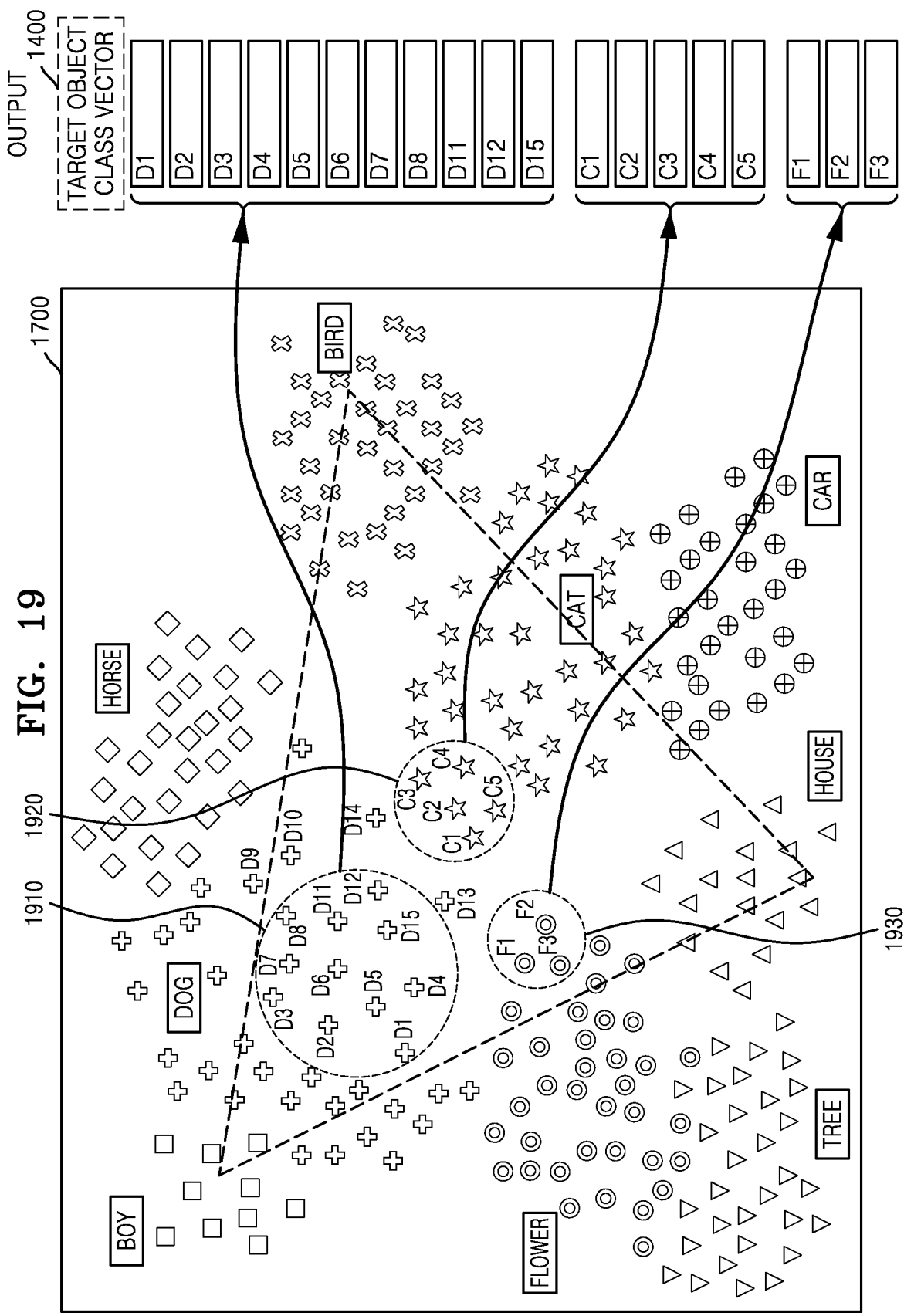
FIG. 19 shows an example of a method used by a target object class vector extraction module to obtain target object class vectors with reference to a word embedding lookup table, according to an embodiment.

FIG. 19 shows an example of a method used by the target object class vector extraction module 622 to obtain the target object class vectors 1400 with reference to the word embedding lookup table 1700, according to an embodiment.

Referring to FIG. 19, the target object class vector extraction module 622 finds, in the word embedding lookup table 1700, a class vector corresponding to a boy, a class vector corresponding to a bird, and a class vector corresponding to a house. Because a distance from a synthesis region to a boy object is 3, a distance from the synthesis region to a bird object is 5, and a distance from the synthesis region to a house object is 20 in an input image, target objects may be determined in consideration of the distances from the synthesis region to the objects. For example, a higher weight may be allocated to the boy, which is the closest object to the synthesis region, to obtain a greater number of class vectors in a dog cluster adjacent to the boy, and a lower weight may be allocated to the house, which is the farthest object from the synthesis region, to obtain a smaller number of class vectors in a cat cluster adjacent to the house.

According to the above-described method, for example, referring to FIG. 19, the target object class vector extraction module 622 may obtain, as the target object class vectors 1400, class vectors D1 to D8 and D11 to D15 within a certain range 1910 of the dog cluster, class vectors C1 to C5 within a certain range 1920 of the cat cluster, and class vectors F1 to F3 within a certain range 1930 of a flower cluster. Therefore, the target object class vector extraction module 622 may output D1 to D8, D11 to D15, C1 to C5, and F1 to F3 as the target object class vectors 1400.

Methods of extracting target object class vectors adjacent to objects detected in an input image, by using a word embedding lookup table are described above with reference to FIGS. 18 and 19. However, the methods illustrated in FIGS. 18 and 19 are merely examples and various methods of extracting target object class vectors by using a word embedding lookup table may be used.

Feature Extraction Module

Figure 20:
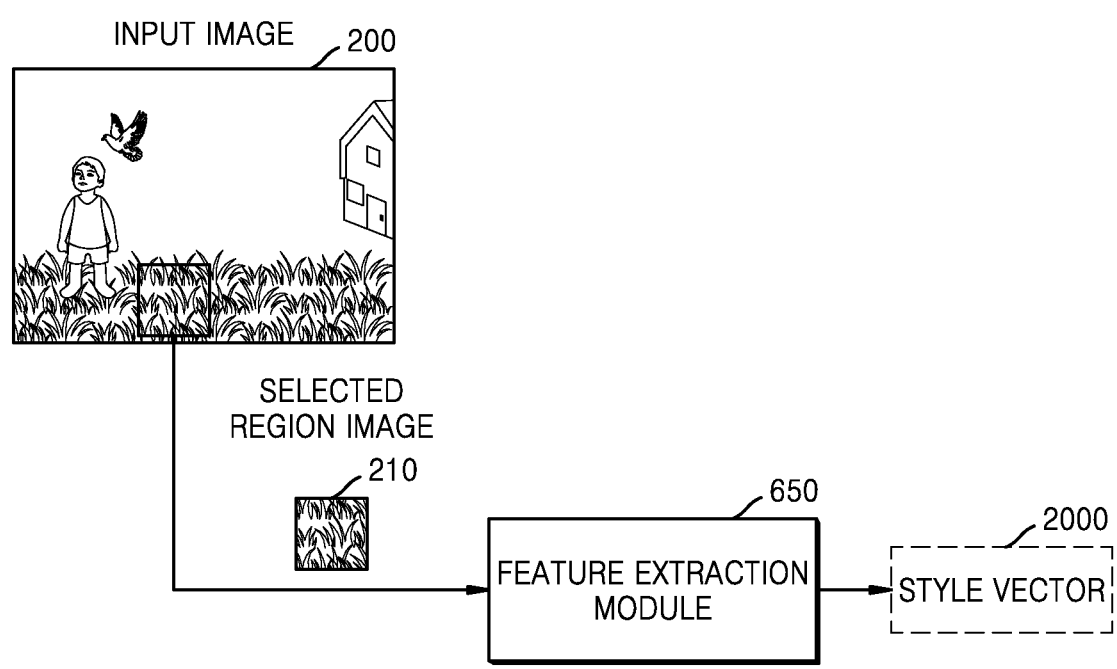
FIG. 20 shows an example of a feature extraction module according to an embodiment.

FIG. 20 shows an example of the feature extraction module 650 according to an embodiment.

Referring to FIG. 20, the feature extraction module 650 may receive a synthesis region image 210 in the input image 200 to be combined with a target object image, extract one or more features from the synthesis region image 210 by using one or more neural networks, and output, to at least one of the image generation module 630 or the image synthesis module 640, style vectors 2000 corresponding to the extracted one or more features.

According to an embodiment, a feature extraction model used by the feature extraction module 650 to extract the features from the synthesis region image 210 by using one or more neural networks may include, for example, each convolutional layer of a classifier pre-trained using ImageNet.

As the feature extraction model, a CNN and variations including attention and skip connection may be used.

Figure 21:
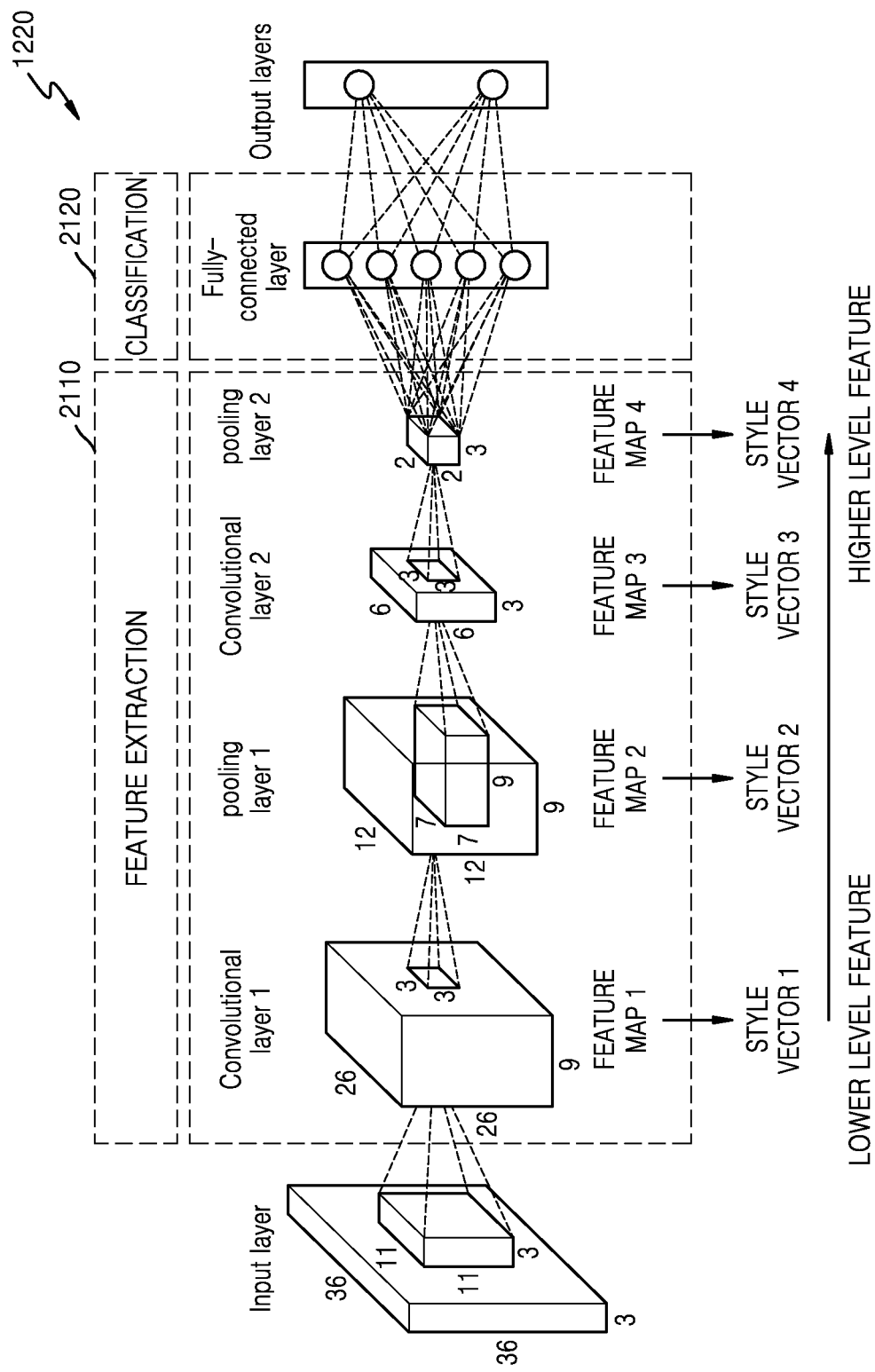
FIG. 21 shows a network architecture of a CNN according to an embodiment.

FIG. 21 shows a network architecture of a CNN 1220 according to an embodiment.

The CNN 1220 includes a convolutional feature extraction part 2110 and a classification part 2120. Features of an input image are extracted through convolutional layers, and classification is performed based on the extracted features by using a related art neural network available to those skilled in the art.

Each convolutional layer serves to extract features from input data and includes a filter for extracting features, and an activation function for converting a value of the filter into a non-linear value. The filter may be a function for detecting whether features of an image to be extracted are present in target data. When a feature map is extracted through the filter as described above, the value is activated by applying the activation function to the feature map. Representative activation functions include, for example, Sigmoid and rectified linear unit (ReLU) functions.

The features extracted as described above are subsampled to reduce the amount of computation by reducing the size of the extracted feature map, and this process is called pooling.

A fully connected layer corresponds to a process of performing classification by applying feature values extracted by convolutional layers, to a related art neural network, and may use, for example, the softmax function.

The feature extraction module 650 may extract one or more feature maps generated in the above-described CNN architecture, e.g., feature maps 1 to 4, and use the same as image features of a synthesis region. The feature extraction module 650 may convert the feature maps 1 to 4 into the form of vectors and output style vectors 1 to 4. The feature extraction module 650 may output one of, for example, the style vectors 1 to 4.

The feature extraction module 650 may extract various features by using convolutional layers and various filters in various image scales.

For example, lower level features of an image may be extracted through a shallower convolutional layer, and higher level features of the image may be extracted through a deeper convolutional layer. For example, in a face image of a person, the lower level features may include local features indicating colors or lines, e.g., a skin color and an edge direction of a jaw, and the higher level features may include combined features of the eyes, the nose, etc. Therefore, the feature extraction module 650 may appropriately extract and use a feature map corresponding to the higher level features and a feature map corresponding to the lower level features.

In addition, a feature factor to be extracted from the image may be adjusted by using, for example, the filter used by each convolutional layer. For example, color or texture features may be extracted from the image by using a filter used to extract color information from the image, or a filter used to extract texture information from the image.

For example, the features of the image may include color and texture features, and the color features may include an image color, a color histogram representing color distribution in the image, color moments, and a color coherence vector whereas the texture features may include edges.

For example, when a part of a grass image is input as the synthesis region of the input image 200 as illustrated in FIG. 20, the feature extraction module 650 may output a style vector corresponding to color features indicating green and a style vector corresponding to texture features indicating grass, based on the synthesis region. As described above, the features of the synthesis region may be used by the image generation module 630 to generate an image of an object to be located in the synthesis region, or be used by the image synthesis module 640 to combine the input image 200 with the target object image.

Image Generation Module

Figure 22:
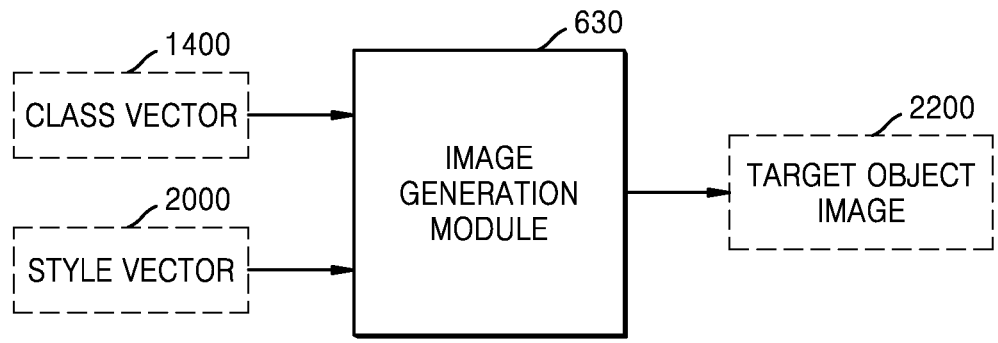
FIG. 22 shows an example of an image generation module according to an embodiment.

FIG. 22 shows an example of the image generation module 630 according to an embodiment.

Referring to FIG. 22, according to an embodiment, the image generation module 630 may receive the target object class vector 1400, and generate a target object image 2200 corresponding to the target object class vector 1400, by using an image generation model.

According to an example, the image generation module 630 may further receive the style vector 2000 in addition to the target object class vector 1400, and generate the target object image 2200 corresponding to the target object class vector 1400 and the style vector 2000, by using the image generation model. As described above, when the style vector 2000 output from the feature extraction module 650 is further used to generate the target object image 2200, the target object image 2200 may be generated more appropriately for a synthesis region of an input image.

A representative example of the image generation model includes a GAN.

Figure 23:
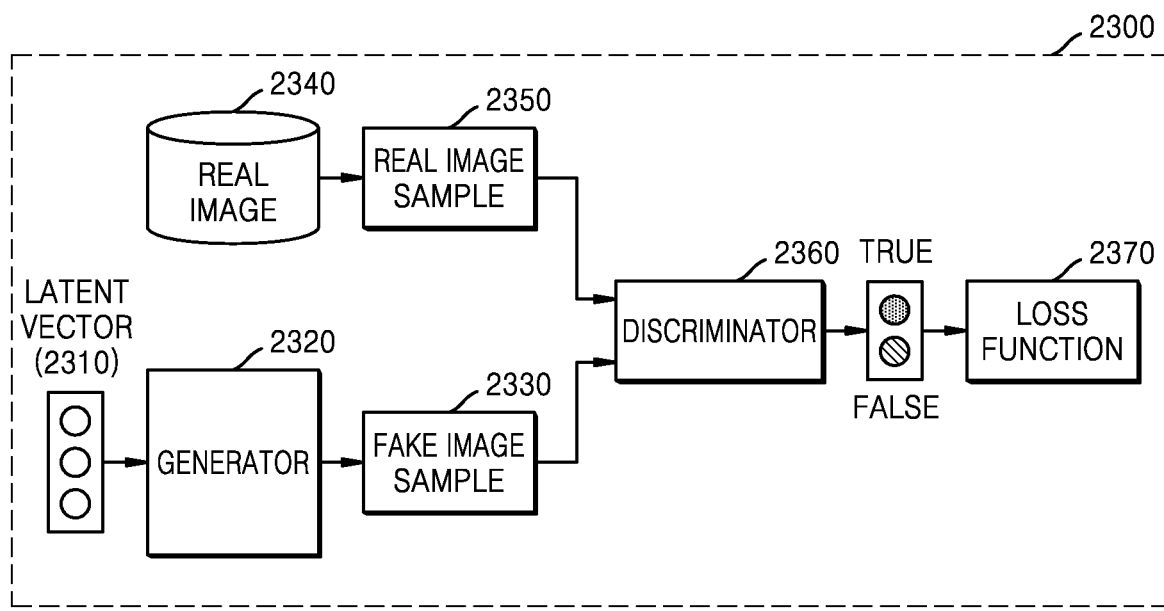
FIG. 23 shows an architecture of a generative adversarial network (GAN) according to an embodiment.

FIG. 23 shows an architecture of a GAN 2300 which may be used by the image generation module 630 according to an embodiment.

Referring to FIG. 23, the GAN 2300 includes a generator 2320 and a discriminator 2360.

The generator 2320 generates a new instance by using random noise, and the discriminator 2360 determines whether each data instance corresponds to a real training data set, i.e., whether an input image is a real image or a fake image, by evaluating data authenticity. When features of the data instance are given, a label or a category of the corresponding data is predicted.

The generator 2320 is a function for receiving a random vector or a latent vector 'z' 2310 as an input and outputting a fake image sample 2330. Herein, 'z' is a value randomly extracted simply from a uniform distribution or a normal distribution. The generator 2320 may be regarded as a function for mapping the simple distribution to a complicated distribution, e.g., a face image of a person. The complicated distribution may be approximated when a generator model includes a sufficient number of parameters. A space including the vector 'z' is called a latent space. Herein, the size of the latent space may be arbitrarily determined, e.g., 100 dimensions. The size of the latent space is not particularly limited but needs to be sufficient enough for target information. This is because the GAN 2300 maps values of the vector 'z' to image attributes.

The generator 2320 is aimed to generate fake data that is indistinguishable from real data.

The discriminator 2360 is trained using real training data (e.g., real world images) and fake data generated by the generator 2320, and serves to determine whether a sample is real or fake. The discriminator 2360 is a function for receiving an image as an input and outputting a probability that the image is real, as a number between 0 and 1.

By repeatedly training the discriminator 2360 in a direction for improving a discrimination ability thereof and by repeatedly training the generator 2320 in a direction for deceiving the discriminator 2360, the generator 2320 is ultimately aimed to generate data that is hard to determine whether it is real or fake, and the discriminator 2360 is ultimately aimed to gradually improve the discrimination ability thereof. The GAN 2300 may train the generator 2320 and the discriminator 2360 in an adversarial manner until an image is hard determine whether it is real or fake.

Figure 24A:
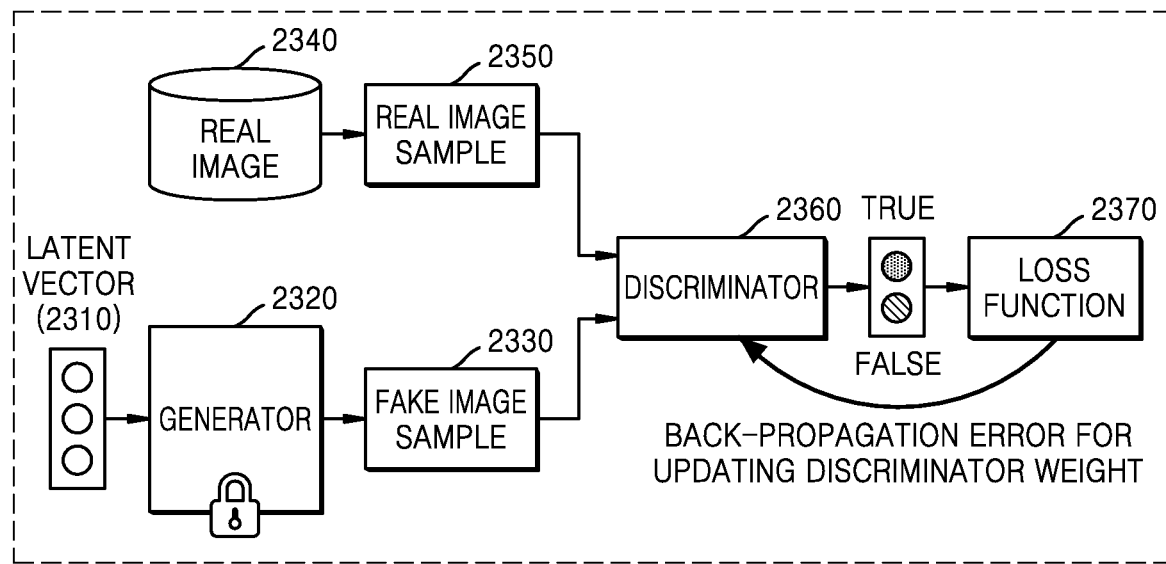
FIG. 24A is a diagram illustrating a method of training an image generation model, according to an embodiment.
Figure 24B:
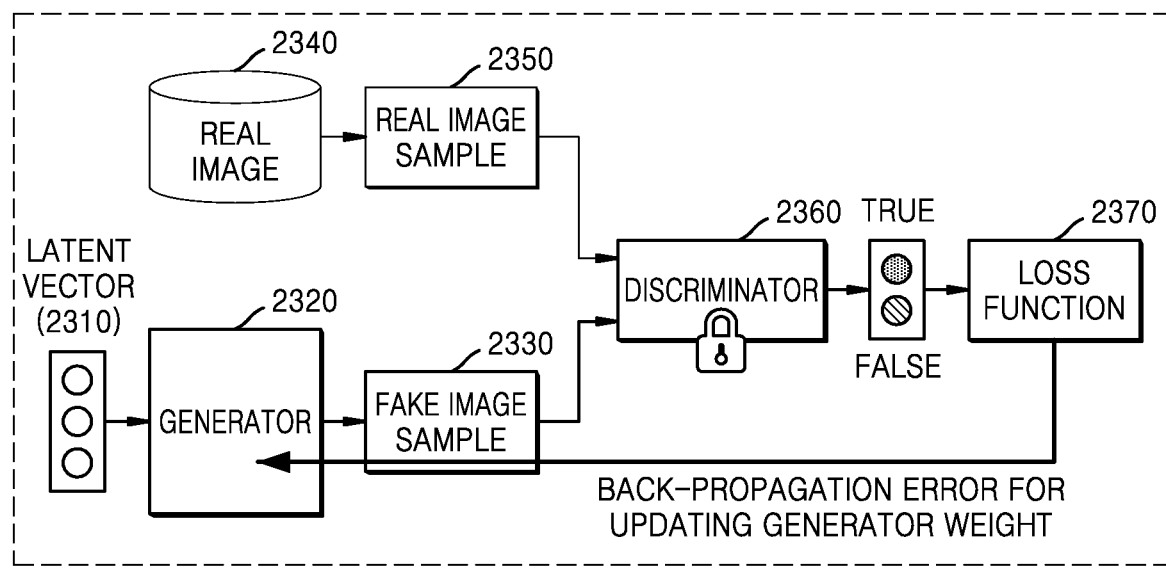
FIG. 24B is a diagram illustrating a method of training an image generation model, according to an embodiment.

FIGS. 24A and 24B are diagrams illustrating a method of training an image generation model, according to an embodiment.

GAN-based learning is performed in two stages, and a first stage is a stage for fixing the generator 2320 and training the discriminator 2360. Because the discriminator 2360 already knows which images are real and which are fake, unlike a related art discriminator training method, a cost function or a loss function is defined and weights are updated by back-propagating errors.

Referring to FIGS. 24A and 24B, the discriminator 2360 outputs a probability value close to 1 when a real image sample 2350 is input from a real image dataset 2340, and output a probability value close to 0 when the fake image sample 2330 is input. Therefore, a loss function 2370 of the discriminator 2360 consists of a sum of two values. A sum of a difference between a value 1 and a value output when a real image is input and a difference between a value 0 and a value output when a fake image is input is the loss function 2370 of the discriminator 2360. The discriminator 2360 is trained by updating parameters of the discriminator 2360 in a direction for minimizing the value of the loss function 2370.

Referring to FIG. 24B, a second stage is a stage for fixing the discriminator 2360 and training the generator 2320. The generator 2320 is aimed to deceive the discriminator 2360 and thus is trained in a direction for making a fake image mistaken for a real image by the discriminator 2360. That is, the purpose of the generator 2320 is to deceive the discriminator 2360. In other words, when a fake image generated by the generator 2320 is input to the discriminator 2360, a value close to 1 is output. A difference between this value and a value 1 serves as a loss function of the generator 2320, and the generator 2320 is trained to minimize the same.

When the above-described two stages are repeatedly performed, the discriminator 2360 and the generator 2320 are improved to equal levels.

Figure 25:
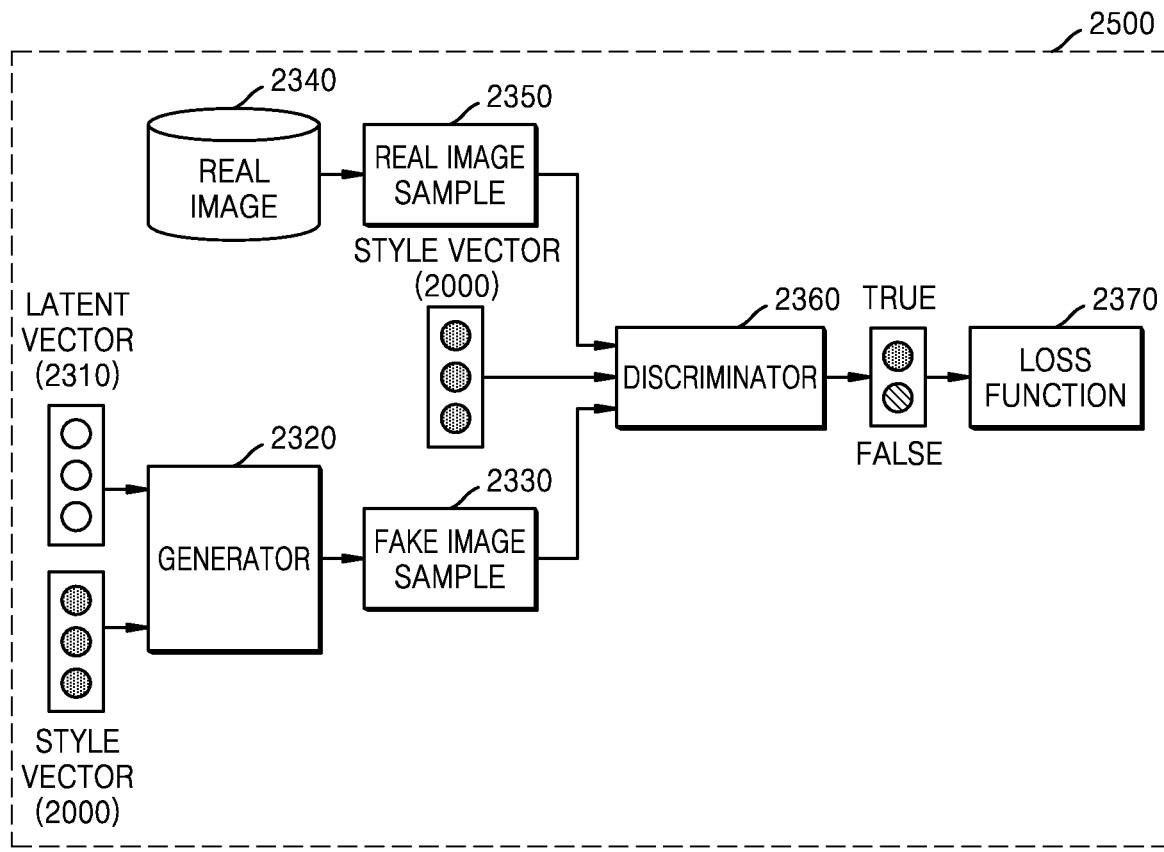
FIG. 25 shows an example of an image generation module further using a style vector, according to an embodiment.

FIG. 25 shows an example of an image generation model 2500 further using the style vector 2000, according to an embodiment. The image generation model 2500 may be used by the image generation module 630.

Referring to FIG. 25, in the image generation model 2500, the style vector 2000 is further added as an input of the generator 2320 and the discriminator 2360.

The image generation model 2500 is trained by adding the style vector 2000 as a condition y to a related art GAN.

The generator 2320 generates the fake image sample 2330 by concatenating the latent vector 2310 and the style vector 2000 and the discriminator 2360 receives the fake image sample 2330 and the style vector 2000 as inputs. However, combination of the style vector 2000 is not limited to concatenation and may also use, for example, a simple sum or projection.

As described above, when the style vector 2000 is further used for training, the image generation model 2500 may generate an image by reflecting image features corresponding to the style vector 2000. For example, when the style vector 2000 relates to features corresponding color information indicating green, the image generation model 2500 may generate an image by further using the color information indicating green. When the style vector 2000 relates to features corresponding edge information indicating grass texture, the image generation model 2500 may generate an image by further using the edge information indicating grass texture.

Figure 26:
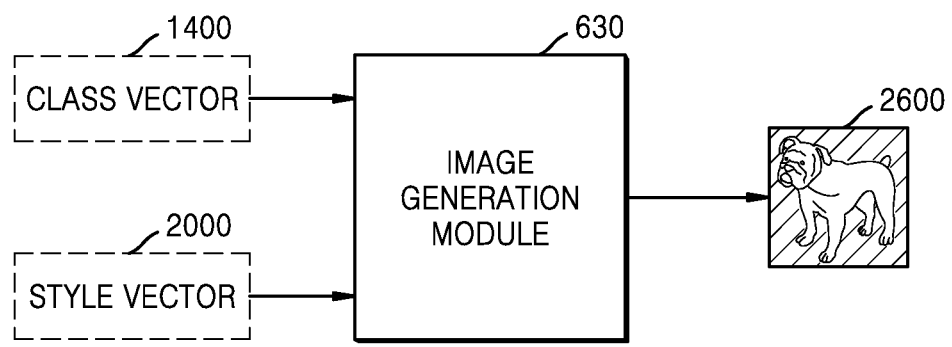
FIG. 26 is a view illustrating an operation of an image generation module using a style vector, according to an embodiment.

FIG. 26 is a view illustrating an operation of the image generation module 630 using the style vector 2000, according to an embodiment.

Referring to FIG. 26, for example, the image generation module 630 may receive a class vector corresponding to <Bulldog>, as the target object class vector 1400, and receive a style vector including color and texture information corresponding to green and grass texture, as the style vector 2000.

The image generation module 630 may generate a target object image 2600, to which a style vector is reflected, as a <Bulldog> image corresponding to the <Bulldog> class vector, by using the color and texture information of the style vector 2000. When the style vector 2000 is not used, the image generation module 630 may generate an arbitrary <Bulldog> image corresponding to the received <Bulldog> class vector. However, when the image generation module 630 receives the style vector 2000, the color and texture information of the style vector 2000 may affect at least one of a foreground or a background of the <Bulldog> image and thus the image generation module 630 may generate a <Bulldog> image to which green or grass texture is reflected.

Image Synthesis Module

Figure 27:
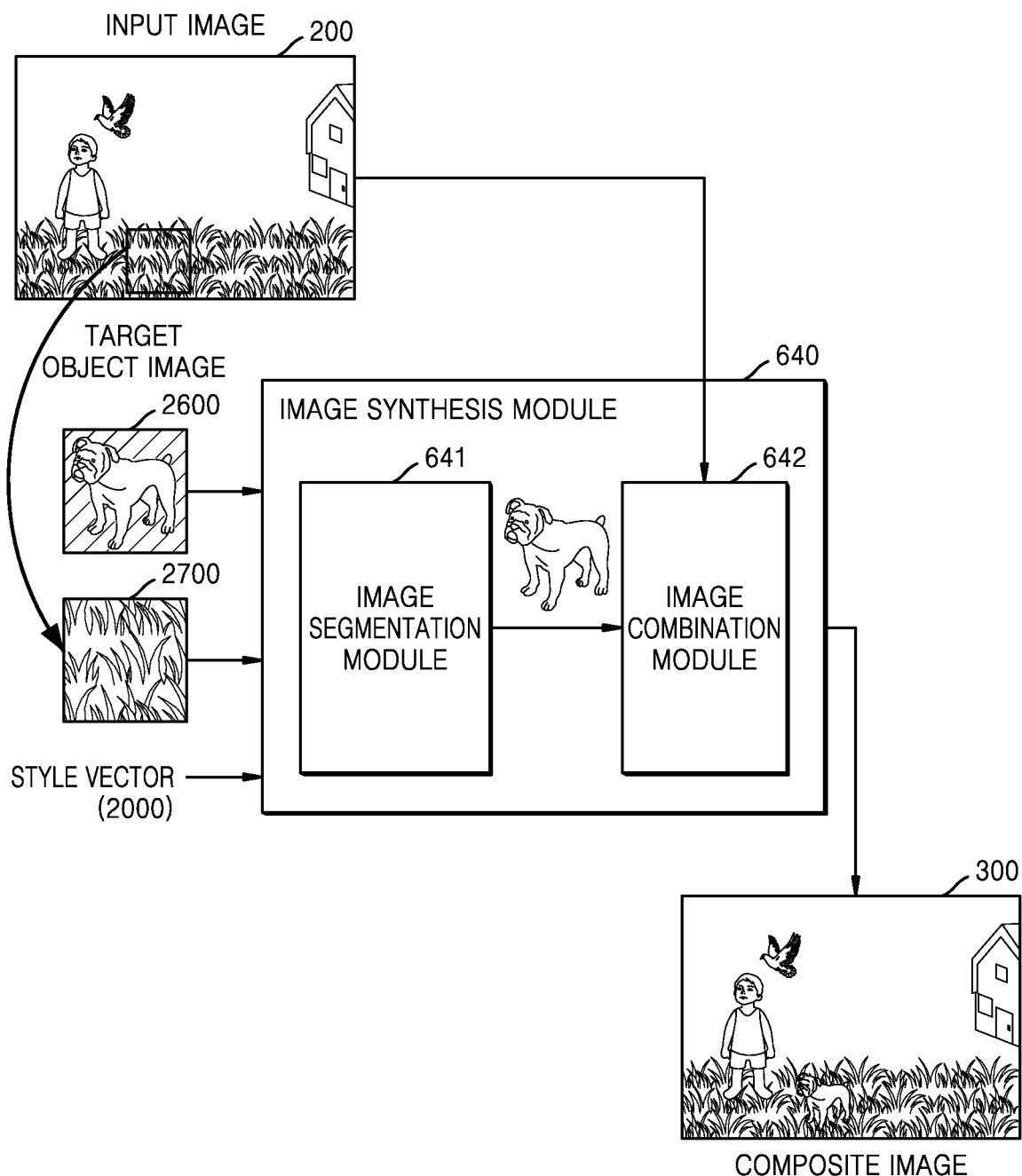
FIG. 27 is a diagram showing an example of an image synthesis module according to an embodiment.

FIG. 27 is a diagram showing an example of the image synthesis module 640 according to an embodiment.

Referring to FIG. 27, the image synthesis module 640 may include an image segmentation module 641 and an image combination module 642.

The image segmentation module 641 recognizes a target object in the target object image 2600 received from the image generation module 630, by using one or more neural networks. According to an embodiment, the image segmentation module 641 may receive the target object image 2600 output from the image generation module 630, a synthesis region image 2700 extracted from the input image 200, and the style vector 2000 output from the feature extraction module 650, recognize the target object in the target object image 2600 by using the received data, and provide the recognized the target object to the image combination module 642.

The image combination module 642 may generate and output the composite image 300 by combining the input image 200 with the target object recognized by the image segmentation module 641.

The image segmentation module 641 will now be described in detail.

Semantic segmentation refers to an operation of accurately extracting boundaries of objects in an image and splitting the image into meaningful regions in order to divide the image into semantically or cognitively similar regions. That is, semantic segmentation defines the boundary of each object in an image by understanding the image at a pixel level and assigning an object class to each pixel of the image.

For example, semantic segmentation generates a predicted result by marking class (or label) values of currently viewed pixels. For example, to segment an image into grass and a dog, a pixel region corresponding to a dog is marked with a value '1' and a grass region is marked with a value '0', and then a model puts a blue mask on the region marked with a value 1 and puts a green mask on the region marked with a value 0, thereby clearly distinguishing between the dog and grass regions.

Figure 28A:
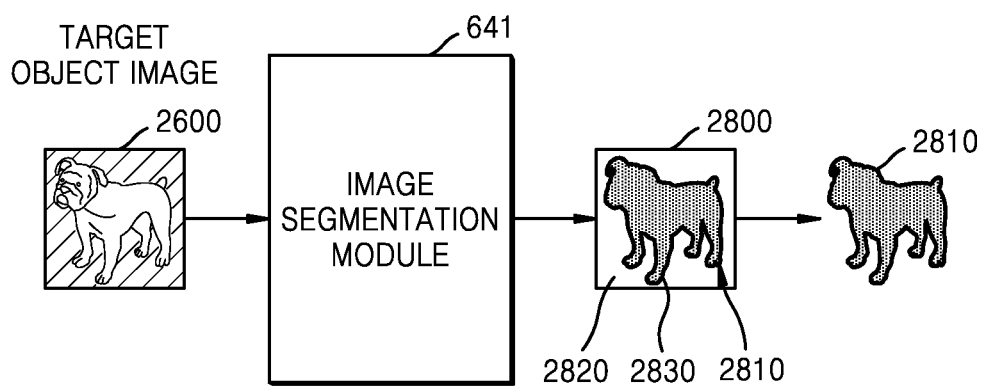
FIG. 28A shows an example of an image segmentation module according to an embodiment.

FIG. 28A shows an example of an image segmentation module according to an embodiment.

Referring to FIG. 28A, the image segmentation module 641 may receive the target object image 2600 output from the image generation module 630.

The image segmentation module 641 may mark a value 1 for a pixel region corresponding to a dog and mark a value 0 for a background region in the received target object image 2600, and put, for example, a gray mask on the region indicated by a value 1 and put, for example, a white mask on the region indicated by a value 0, to check a boundary of the dog corresponding to an object in the target object image 2600. By specifying a region corresponding to the dog in the target object image 2600 and outputting pixel information corresponding to the dog, a target object region 2810 (e.g., a dog region) in the target object image 2600 may be output.

A resultant image 2800 may include information for distinguishably identifying the target object region 2810 and a background region 2820 in the target object image 2600. However, a boundary region 2830 between the target object region 2810 and a background region 2820 may be unnaturally detected because pixels to be recognized as a background may be recognized as an object or pixels to be recognized as an object may be recognized as a background. The boundary region 2830 unnaturally detected as described above is indicated with a thick line in FIG. 28A.

Figure 28B:
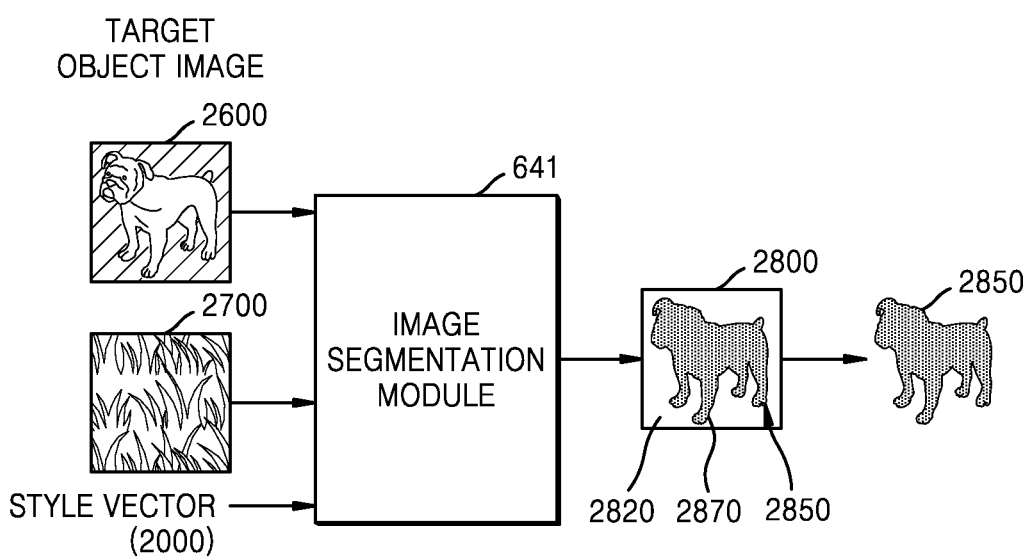
FIG. 28B shows an example of an image segmentation module according to an embodiment.

FIG. 28B is an example of the image segmentation module according to an embodiment.

In an embodiment, to prevent unnatural detection of an object boundary as illustrated in FIG. 28A, the image segmentation module 641 may further include, as inputs, the synthesis region image 2700 and the style vector 2000 in addition to the target object image 2600.

The target object image 2600 may include three channels of RGB, and the synthesis region image 2700 may also include three channels of RGB. The style vector 2000 may include various numbers of channels. For example, when color features and edge features are included, the style vector 2000 may include four channels including three channels of RGB for the color features and one channel for the edge features.

As described above, the image segmentation module 641 receives data of ten channels and recognizes a target object in a target object image by using the received data. In this case, the image segmentation module 641 may naturally detect a boundary region 2870 of the target object in the target object image in further consideration of the synthesis region image 2700 and the style vector 2000 indicating features of the synthesis region image 2700. The boundary region 2870 more naturally detected using the style vector 2000 is indicated with a thin line in FIG. 28B.

When an image corresponding to a target object region 2810 or 2850 is input to the image combination module 642 by the image segmentation module 641, the image combination module 642 may generate a composite image by combining the image corresponding to the target object region 2810 or 2850, which is received from the image segmentation module 641, on a region of the input image 200 to be combined with a target object.

Figure 29:
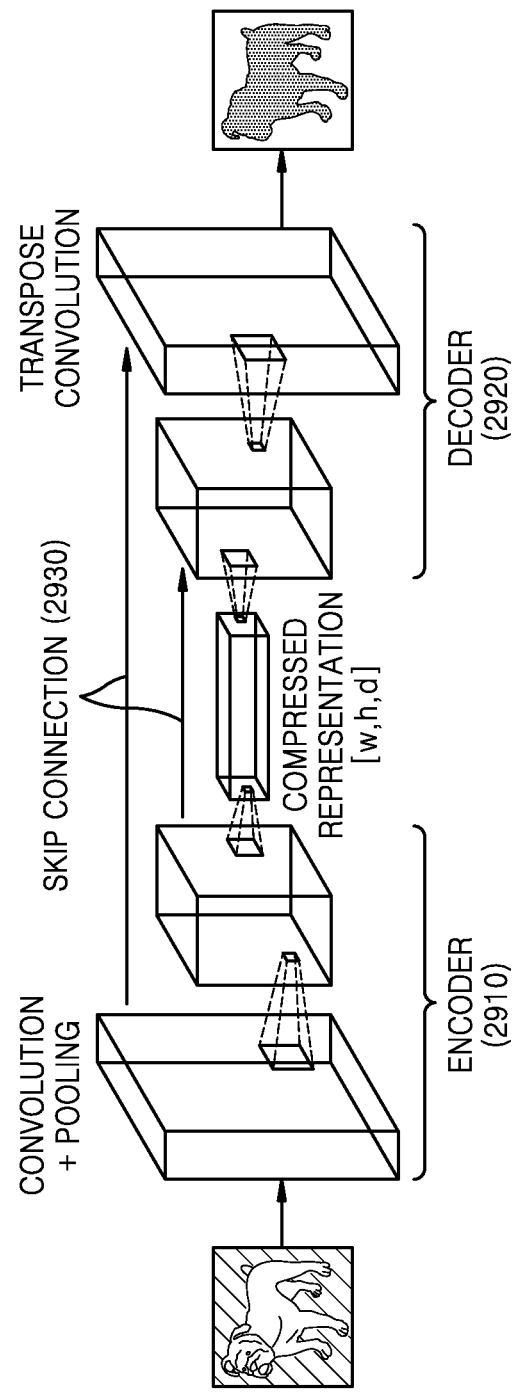
FIG. 29 shows an example of a semantic segmentation model according to an embodiment.

FIG. 29 shows an example of a semantic segmentation model according to an embodiment.

Semantic segmentation models have an encoder-decoder structure. An encoder represents information of an input image as a compressed vector, and a decoder generates a result in a desired size.

Referring to FIG. 29, the semantic segmentation model according to an embodiment includes an encoder 2910 and a decoder 2920.

The encoder 2910 performs a downsampling process for enabling deep convolution with a small memory by reducing dimensions of an image. For example, convolution with a stride of 2 or above is used or a pooling layer is used. When this process is performed, feature information of the image is lost, and a fully-connected network is mostly used without providing a fully-connected layer at the end.

The decoder 2920 mostly performs an upsampling process for increasing dimensions of the downsampled image to the dimensions of the input image.

Such encoder-decoder models include, for example, a fully convolutional network (FCN), SegNet, and U-Net.

The pooling layer of the encoder 2910 may discard location information, increase views, and collect context of the image. However, because semantic segmentation requires an accurate class map alignment, the location information may be retained. The U-Net includes an encoder for gradually reducing spatial dimensions through a pooling layer, a decoder for gradually reconstructing object details and the spatial dimensions, and a shortcut connection from the encoder to the decoder to allow the decoder to reconstruct the object details well. This connection is called a skip connection.

The U-Net is a model obtained by adding a skip connection 2930 to the encoder-decoder structure. When the image size is reduced (downsampling) and then is increased again (upsampling), detailed pixel information is lost. However, because the above problem may be considered seriously in image segmentation which require pixel-based dense prediction, the decoder 2920 may obtain a much clearer image and perform more accurate prediction through the skip connection 2930 for directly providing the location information from the encoder 2910 to the decoder 2920.

A composite image generated by the image synthesis module 640 as described above may be output. The composite image may be provided to a display and be displayed on the display.

Object Control Module

Figure 30:
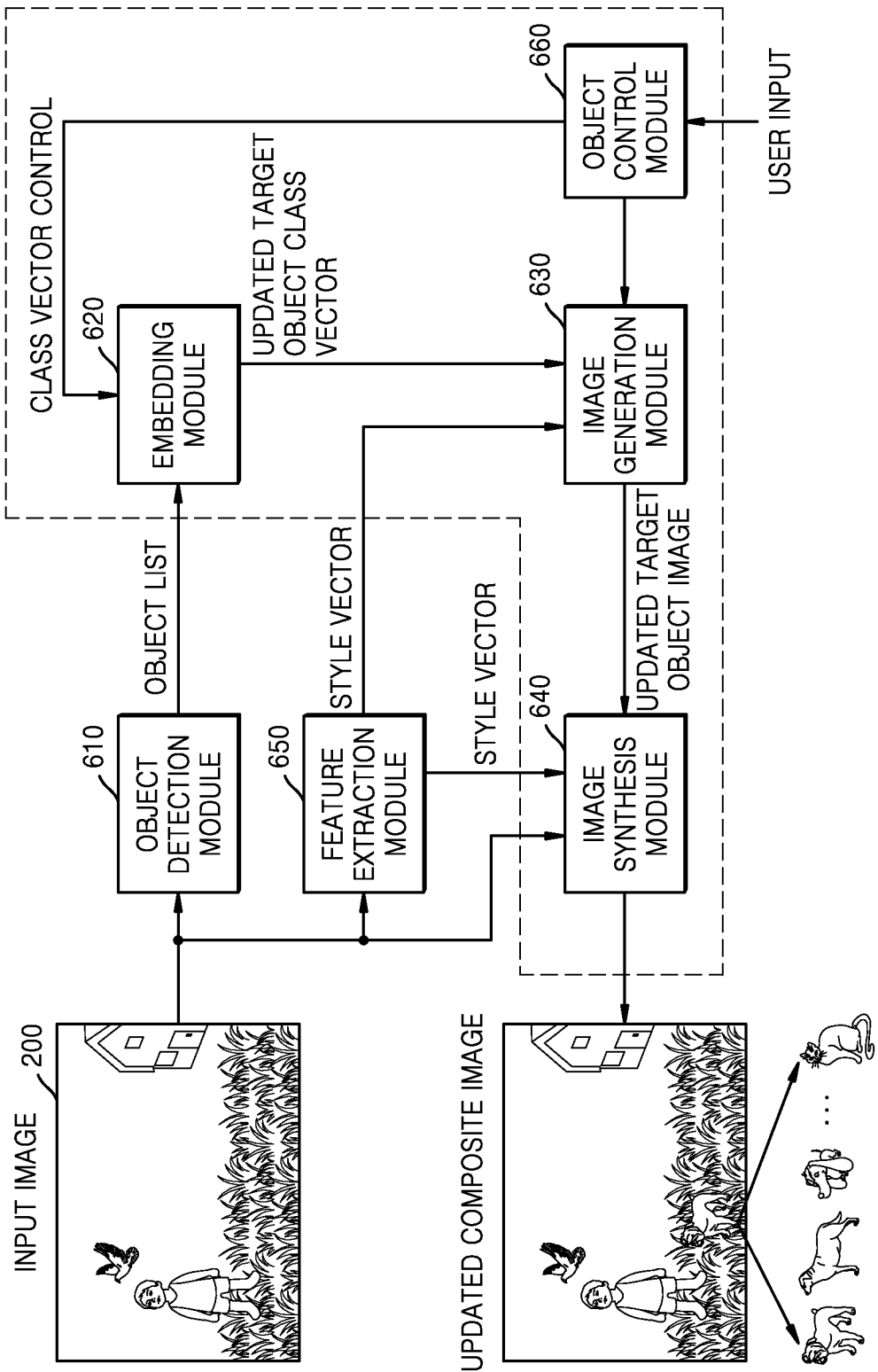
FIG. 30 is a view illustrating an object control module according to an embodiment.

FIG. 30 is a view illustrating the object control module 660 according to an embodiment.

Referring to FIG. 30, the object control module 660 may receive a user input for controlling and updating a target object included in an output composite image.

For example, when the composite image generated by the image synthesis module 640 and including the target object is output on a display, a user may view the output composite image and then desire to change the target object included in the composite image. In this case, the user may input, to an electronic device, a control command (i.e., a user input) for changing or updating the target object included in the composite image, and the object control module 660 may receive the user input.

The user input for controlling the target object may be implemented in various forms. For example, when the display of the electronic device is implemented as a touchscreen display, a user input for touching the target object in the composite image displayed on the display may be used as the user input for controlling the target object. Alternatively, instead of touch, a gesture or voice of the user may be used. Alternatively, a scroll bar for controlling the target object may be displayed on the display.

Figure 31:
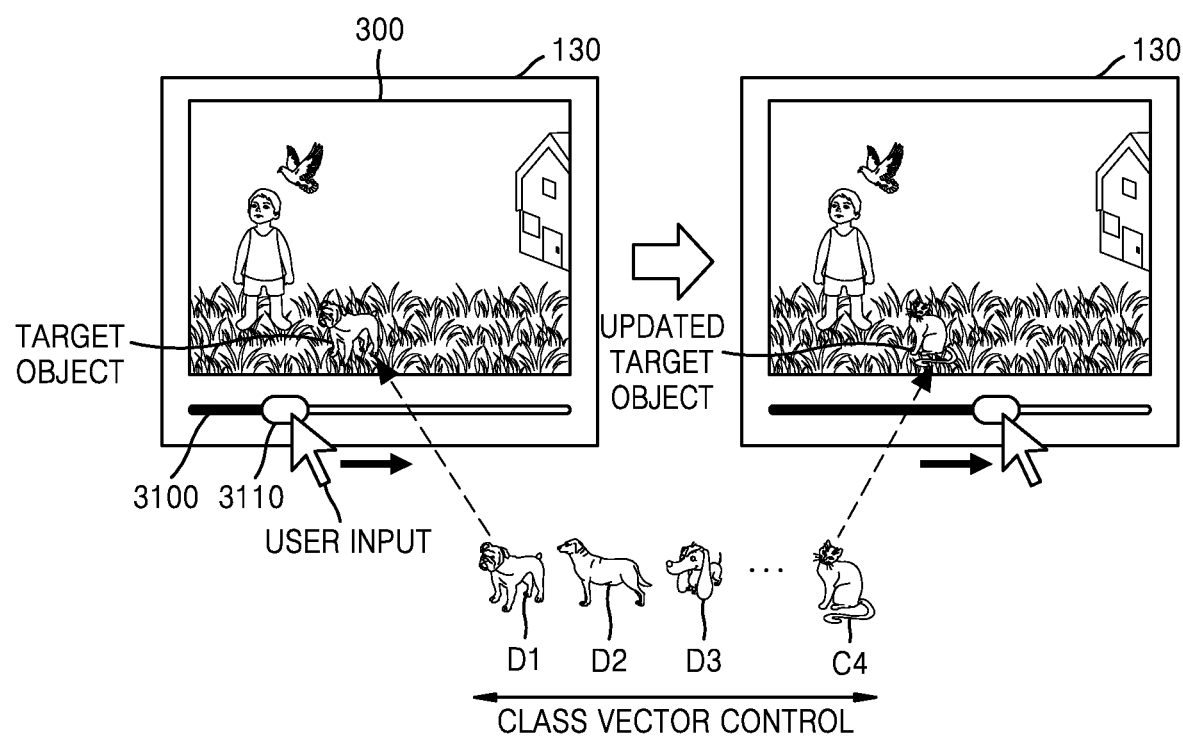
FIG. 31 is a view illustrating an example of displaying a scroll bar to control a target object, according to an embodiment.

FIG. 31 is a view illustrating an example of displaying a scroll bar 3100 to control a target object, according to an embodiment.

Referring to FIG. 31, the electronic device 100 may output, on the display 130, the composite image 300 generated by combining an input image with a target object image. In this case, the electronic device 100 may display, on the display 130, the composite image 300 together with the scroll bar 3100 for receiving a user input for controlling the target object. The scroll bar 3100 may include a scroll button 3110 movable on the scroll bar 3100. A user may move the scroll button 3110 on the scroll bar 3100 by using various input means. Distance information and location information of the scroll button 3110 moved by the control of the user may be used as inputs for an operation of updating a target object class vector.

The object control module 660 may receive the distance information and the location information of the scroll button 3110, and provide, to the embedding module 620, the received distance and location information together with a command for instructing to update the target object class vector.

When the distance information and the location information are received together with the command for instructing to update the target object class vector, the embedding module 620 may update the target object class vector, based on the distance information or the location information.

FIG. 31 illustrates that the display 130 generates and displays a composite image including an updated target object image corresponding to a class vector C4, according to the class vector control of the user. That is, although a composite image including a <Bulldog> image as the target object image is initially displayed, by the scroll control of the user who desires to update the target object image, the target object image is updated to other types of dogs D2, D3, . . . and then is updated to types of cats . . . , C4 after all types of dogs are displayed.

Figure 32:
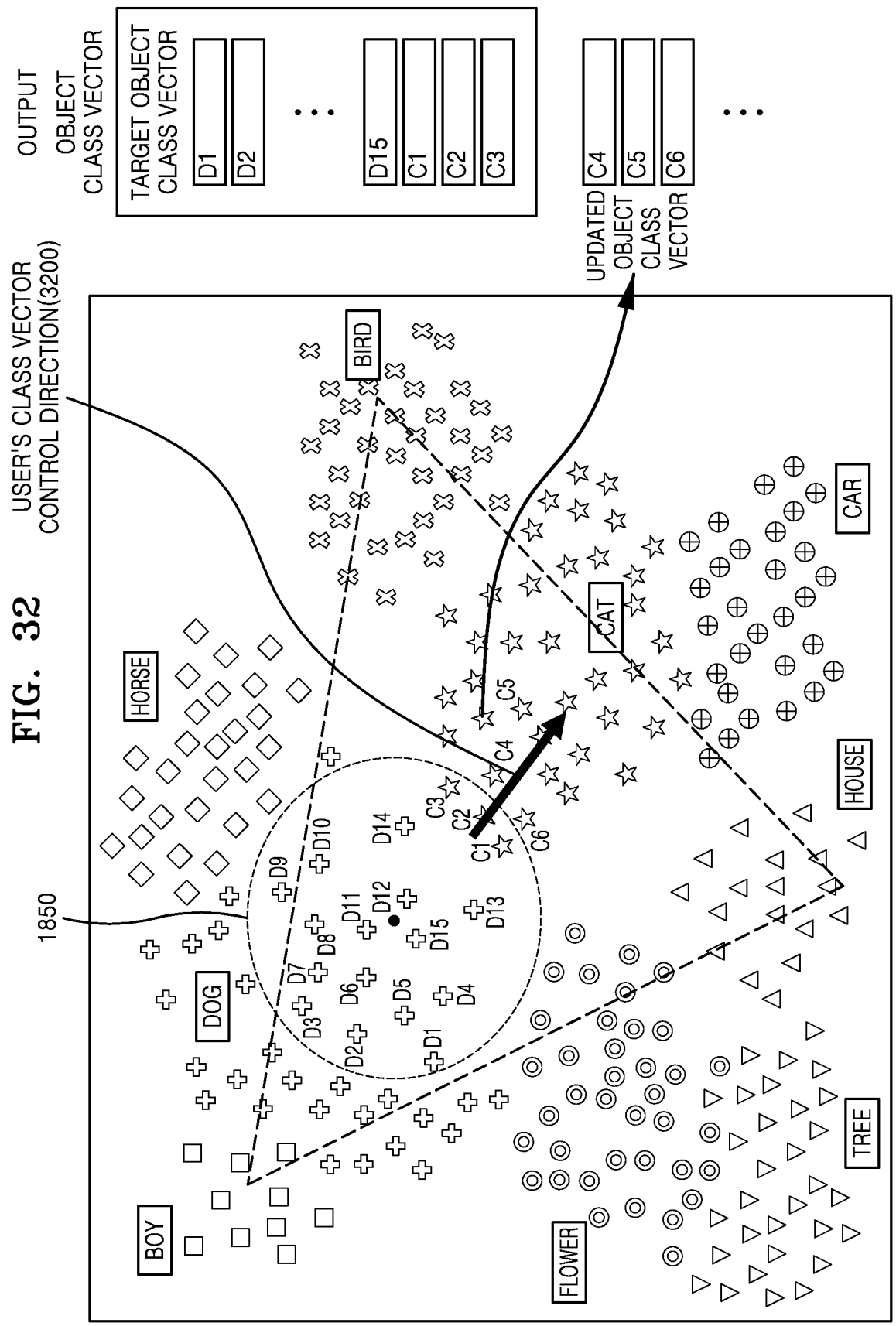
FIG. 32 is a view illustrating an operation performed by an embedding module to update a target object class vector, according to an embodiment.

FIG. 32 is a view illustrating an operation performed by the embedding module 620 to update a target object class vector, according to an embodiment.

The operation performed by the embedding module 620 to update the target object class vector is basically similar to the operation performed by the embedding module 620 to obtain the target object class vector, which is described above with reference to FIG. 14. As described above with reference to FIG. 14, the embedding module 620 has already generated a certain number of target object class vectors. For example, referring to FIG. 18, the embedding module 620 has obtained fifteen class vectors D1 to D15 in a DOG class, and three class vectors C1 to C3 in a CAT class. An electronic device may have generated a target object image and a composite image corresponding to the already obtained target object class vector. Therefore, when a range according to the control of a user is within a certain range 1850, the electronic device may output the generated composite images.

However, when the range according to the control of the user is out of the certain range 1850, the electronic device may update a target object class vector corresponding to a user input.

For example, referring to FIG. 32, when a class vector control direction 3200 according to a user input indicates a bottom right direction of the certain range 1850, for example, class vectors C4, C5, and C6 in a CAT class may be obtained as updated target object class vectors.

The target object class vectors C4, C5, and C6 newly obtained by the embedding module 620 may pass through the image generation module 630 and the image synthesis module 640, and composite images including updated target objects corresponding to C4, C5, and C6 may be generated.

Referring back to FIG. 31, the user may control the target object class vector by using a user input. For example, when the electronic device 100 initially outputs a composite image including a target object corresponding to the class vector D1 and when the user moves the scroll button 3110 in a unit for the class vector control, the electronic device 100 may output a composite image including a target object corresponding to the class vector D2. For example, when the user continuously moves the scroll button 3110, the electronic device 100 may output a composite image including a target object corresponding to the class vector C4. As described above, the user may update the target object included in the composite image, by moving the scroll button 3110 until a target object desired by the user is displayed on the composite image. For example, when the user desires to combine a dog of another species, a currently combined dog may be changed sequentially from the most similar dog to the least similar dog by linearly moving a gauge in a direction and be changed to other types of animals such as cats or lions by further moving the gauge.

As described above, the object control module 660 may update the target object to be located in the composite image displayed on the display, according to a simple user input and thus a target object desired by the user may be conveniently obtained.

Figure 33:
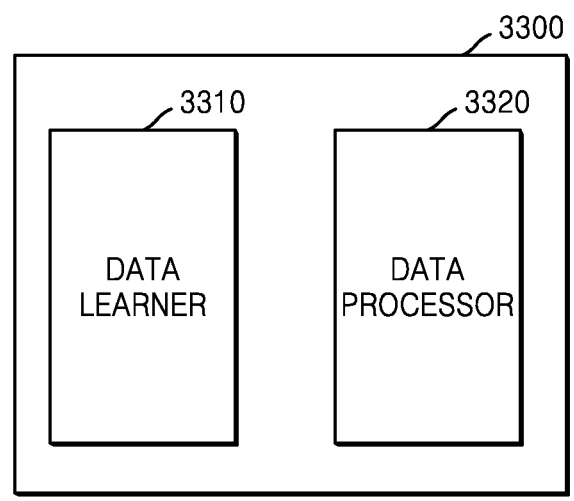
FIG. 33 is a block diagram for separately describing a configuration of a processor in terms of training and processing of neural networks, according to an embodiment.

FIG. 33 is a block diagram illustrating a configuration of a processor 3300 in terms of training and processing of neural networks, according to an embodiment. For example, the processor 3300 may correspond to the processor 120 described above.

Referring to FIG. 33, the processor 3300 according to an embodiment may include a data learner 3310 and a data processor 3320.

The data learner 3310 may learn criteria for detecting one or more objects in an input image, to train a first neural network according to an embodiment. The data learner 3310 may learn criteria for a type of information (e.g., feature information) of the input image to be used to detect the objects. In addition, the data learner 3310 may learn criteria for a method of detecting the objects by using the feature information of the image. The data learner 3310 may obtain data (e.g., an image) to be used for learning, and learn the criteria for detecting the one or more objects in the image, by applying the obtained data to a data processing model (i.e., the first neural network).

The data learner 3310 may learn criteria for obtaining an object class vector by using an input object class, to train a second neural network according to an embodiment. The data learner 3310 may learn criteria for a type of information (e.g., feature information) of the image to be used to obtain emotion information.

The data learner 3310 may learn criteria for extracting image features from the input image, to train a third neural network according to an embodiment.

The data learner 3310 may learn criteria for generating an object image by using an input object class vector, to train a fourth neural network according to an embodiment.

The data learner 3310 may learn criteria for recognizing an object in an input object image, to train a fifth neural network according to an embodiment.

The data processing models (e.g., the first to fifth neural networks) may be configured in consideration of, for example, an applicable field of the data processing models, the purpose of learning, or the computing performance of a device. The data processing models may be, for example, neural-network-based models. For example, the data processing models may use DNN-, RNN-, or BRDNN-based models, but are not limited thereto.

The data learner 3310 may train the data processing models by using a learning algorithm including, for example, error back-propagation or gradient descent.

The data learner 3310 may train the data processing models through, for example, supervised learning using training data as input values. The data learner 3310 may train the data processing models through, for example, unsupervised learning for finding data processing criteria by autonomously learning types of data required for data processing without any supervision. The data learner 3310 may train the data processing models through, for example, reinforcement learning using feedback on whether training result values are correct.

When the data processing models are trained, the data learner 3310 may store the trained data processing models. In this case, the data learner 3310 may store the trained data processing models in a memory of an electronic device. Alternatively, the data learner 3310 may store the trained data processing models in a memory of a server connected to the electronic device in a wired or wireless network.

The data processor 3320 may input an image to the data processing model including the trained first neural network, and the data processing model may output, as a result value, information on one or more objects detected in the image. The output result value may be used to update the data processing model including the first neural network.

The data processor 3320 may input one or more object classes to the data processing model including the trained second neural network, and the data processing model may output, as a result value, target object class vectors adjacent to the one or more object classes. The output result value may be used to update the data processing model including the second neural network.

The data processor 3320 may input an image to the data processing model including the trained third neural network, and the data processing model may output, as a result value, feature information of the image. The output result value may be used to update the data processing model including the third neural network.

The data processor 3320 may input one or more target object class vectors to the data processing model including the trained fourth neural network, and the data processing model may output, as a result value, target object images corresponding to the one or more target object class vectors. The output result value may be used to update the data processing model including the fourth neural network.

The data processor 3320 may input a target object image to the data processing model including the trained fifth neural network, and the data processing model may output, as a result value, a result of recognizing a target object in the target object image. The output result value may be used to update the data processing model including the fifth neural network.

At least one of the data learner 3310 or the data processor 3320 may be produced in the form of at least one hardware chip and be mounted in the electronic device. For example, at least one of the data learner 3310 or the data processor 3320 may be produced in the form of a dedicated hardware chip for AI, or as a part of a processor (e.g., a CPU or an application processor) or a dedicated graphic processor (e.g., a GPU).

In a wired or wireless manner, information on models configured by the data learner 3310 may be provided to the data processor 3320, and data input to the data processor 3320 may be provided to the data learner 3310 as additional training data.

At least one of the data learner 3310 or the data processor 3320 may be implemented as a software module. When at least one of the data learner 3310 or the data processor 3320 is implemented as a software module (or a program module including instructions), the software module may be stored in a non-transitory computer readable medium. In this case, at least one software module may be provided by an OS or by a certain application. Alternatively, a part of at least one software module may be provided by an OS and the other part may be provided by a certain application.

The data learner 3310 and the data processor 3320 may be mounted in one electronic device or separate electronic devices. For example, one of the data learner 3310 and the data processor 3320 may be included in an electronic device and the other may be included in a server.

According to an embodiment, the data learner 3310 and the data processor 3320 may be mounted in an electronic device of a user, and both learning and data processing may be performed in the electronic device of a user.

According to an embodiment, the data learner 3310 may be mounted in a server, and the data processor 3320 including the trained models may be mounted in an electronic device of a user.

Figure 34A:
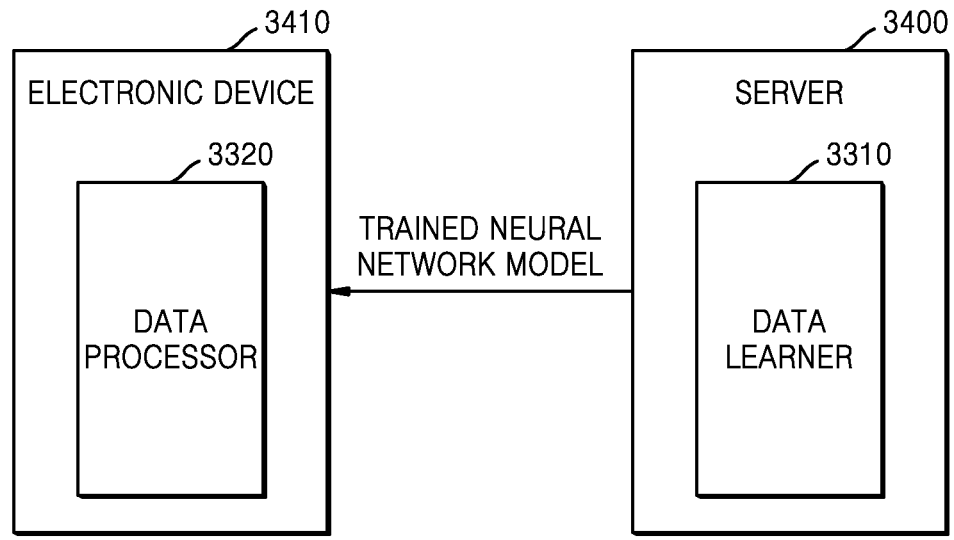
FIG. 34A shows an example of a data learner mounted in a server and a data processor mounted in an electronic device of a user, according to an embodiment.

FIG. 34A shows an example of the data learner 3310 mounted in a server 3400 and the data processor 3320 mounted in an electronic device 3410 of a user, according to an embodiment. For example, the electronic device 3410 of a user may correspond to the electronic device 100 described above or may be a different device.

Referring to FIG. 34A, the server 3400 may obtain an image synthesis neural network model by learning a method of combining two or more images according to the method described herein, by using the data learner 3310. The server 3400 may provide the trained neural network model to the electronic device 3410 of a user. The electronic device 3410 of a user may implement the data processor 3320 by using the trained neural network model received from the server 3400. When a user desires to combine images, the electronic device 3410 of a user may autonomously combine the images according to a user request by using the data processor 3320 without communicating with the server 3400, and output a composite image on a display of the electronic device 3410 of a user.

Figure 34B:
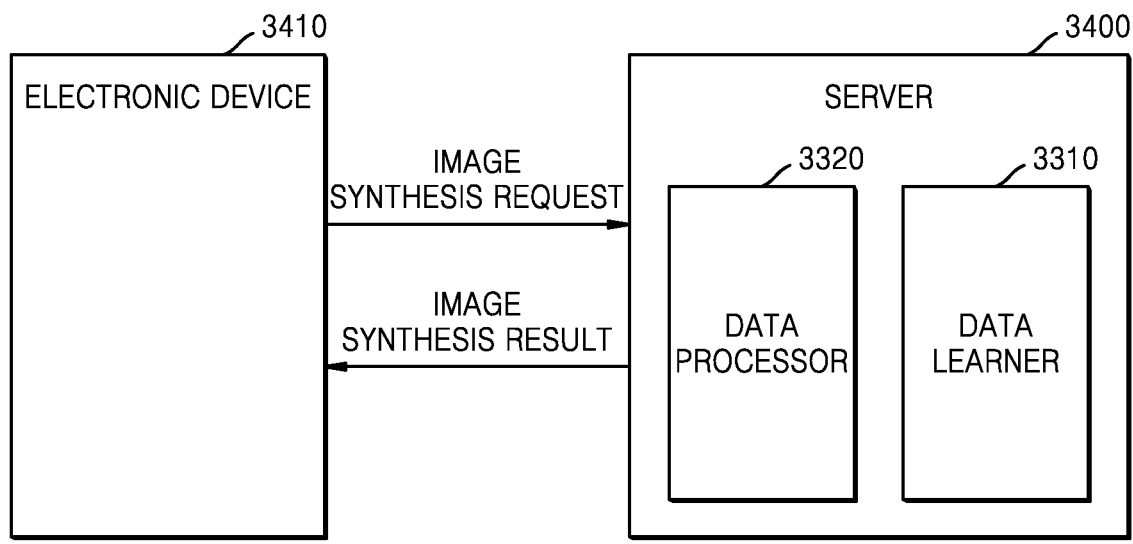
FIG. 34B shows an example of a data learner and a data processor mounted in a server, according to an embodiment.

FIG. 34B shows an example of the data learner 3310 and the data processor 3320 mounted in the server 3400, according to an embodiment.

Referring to FIG. 34B, the data learner 3310 and the data processor 3320 are both mounted in the server 3400. Therefore, the server 3400 may obtain an image synthesis neural network model by learning a method of combining two or more images according to the method described herein, by using the data learner 3310, and implement the data processor 3320 by using the obtained image synthesis neural network model.

When a user desires to combine images, the electronic device 3410 of a user transmits an image synthesis request to the server 3400, and the server 3400 may generate a composite image by combining the images according to the user request by using the data processor 3320 and output the composite image to the electronic device 3410 of a user to display the composite image on a display of the electronic device 3410 of a user.

An operating method of an electronic device, according to an embodiment, may be implemented in the form of program commands executable by various computer means and be recorded on a computer-readable recording medium. For example, software (e.g., the program) containing one or more instructions may be stored in a machine-readable (e.g., computer-readable) storage medium (e.g., internal memory) or external memory. The computer-readable recording medium may include program commands, data files, data structures, or a combination thereof. The program commands recorded on the medium may be those specifically designed and configured for embodiments, or those known to one of ordinary skill in the relevant art. Examples of the computer-readable recording medium include magnetic media (e.g., hard disks, floppy disks, and magnetic tape), optical media (e.g., CD-ROMs and DVDs), magneto-optical media (e.g., floptical disks), and hardware devices (e.g., ROMs, RAMs, and flash memories, etc.) that are specially configured to store and execute program commands. Examples of the program commands include both machine code, such as produced by a compiler, and high-level language code that may be executed by the computer using an interpreter.

According to embodiments, a user does not need to manually find an appropriate target image to be combined with an input image and an electronic device using machine learning may generate and provide candidate images appropriate for the input image.

Further, according to embodiments, the electronic device may change the candidate images to a style appropriate for the input image, by using features of a synthesis location selected in the input image by the user.

In addition, according to embodiments, the candidate images appropriate for the input image may be updated according to the control of the user and thus the user may more conveniently and accurately obtain a desired composite image in a time-efficient manner.

While have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic device comprising:
a memory storing one or more instructions; and
a processor configured to execute the one or more instructions to:
receive a selection of a synthesis region in an input image,
detect at least one object from the input image,
obtain first distance information indicating a distance between a location of the synthesis region and a location of the at least one object,
obtain, by using one or more neural networks, a target object image to be located in the synthesis region of the input image based on the first distance information,
generate, by using the one or more neural networks, a composite image by combining the input image with the target object image, and
control a display of the electronic device to display the composite image.

2. The electronic device of claim 1, wherein the processor is further configured to execute the one or more instructions to:
detect a plurality of objects in the input image, the at least one object being one of the plurality of objects,
obtain object classes corresponding to the plurality of objects, respectively, and location information of the plurality of objects in the input image, respectively, by using a first neural network among the one or more neural networks, and
obtain second distance information from a center of the synthesis region to the plurality of objects, respectively, based on location information of the synthesis region and the location information of the plurality of objects.

3. The electronic device of claim 2, wherein the processor is further configured to execute the one or more instructions to obtain a class vector of a target object providable in the target object image, based on the object classes, by using a second neural network among the one or more neural networks.

4. The electronic device of claim 3, wherein the processor is further configured to execute the one or more instructions to:
obtain class vectors of the plurality of objects, respectively, by using the second neural network, and
obtain the class vector of the target object adjacent to the class vectors of the plurality of objects, based on the second distance information from the center of the synthesis region to the plurality of objects, respectively, by using a word embedding lookup table generated based on the second neural network.

5. The electronic device of claim 4, wherein the processor is further configured to execute the one or more instructions to obtain the class vector of the target object by allocating a higher weight to a class vector of an object among the plurality of objects that is located closer to the center of the synthesis region.

6. The electronic device of claim 3, wherein the processor is further configured to execute the one or more instructions to generate the target object image corresponding to the class vector of the target object, by using a third neural network among the one or more neural networks.

7. The electronic device of claim 6, wherein the processor is further configured to execute the one or more instructions to:
extract synthesis region image features corresponding to an image of the synthesis region, by using a fourth neural network among the one or more neural networks, and
generate the target object image corresponding to the class vector of the target object, by reflecting the synthesis region image features to the target object image, by using the third neural network.

8. The electronic device of claim 7, wherein the processor is further configured to execute the one or more instructions to combine the input image with the target object image to which the synthesis region image features are reflected, by using a fifth neural network among the one or more neural networks.

9. The electronic device of claim 1, wherein the processor is further configured to execute the one or more instructions to:
generate an updated target object image based on a user input for controlling the target object image included in the displayed composite image, and
control the display to display the updated target object image.

10. The electronic device of claim 9, wherein the processor is further configured to execute the one or more instructions to:
output, to the display, a scroll bar for controlling an update of the target object image,
obtain an updated class vector adjacent to a class vector corresponding to a target object, according to the user input through the scroll bar,
obtain the updated target object image, based on the updated class vector,
generate an updated composite image by combining the input image with the updated target object image, and
control the display to display the updated composite image.

11. An operating method of an electronic device, the operating method comprising:
receiving a selection of a synthesis region in an input image;
detecting at least one object from the input image;
obtaining first distance information indicating a distance between a location of the synthesis region and a location of the at least one object;
obtaining, by using one or more neural networks, a target object image to be located in the synthesis region of the input image, based on the first distance information;
generating, by using the one or more neural networks, a composite image by combining the input image with the target object image; and
displaying the composite image on a display.

12. The operating method of claim 11, further comprising:
detecting a plurality of objects in the input image, the at least one object being one of the plurality of objects;
obtaining object classes corresponding to the plurality of objects, respectively, and location information of the plurality of objects in the input image, respectively, by using a first neural network among the one or more neural networks; and
obtaining second distance information from a center of the synthesis region to the plurality of objects, respectively, based on location information of the synthesis region and the location information of the plurality of objects.

13. The operating method of claim 12, further comprising obtaining a class vector of a target object, based on the object classes, by using a second neural network among the one or more neural networks.

14. The operating method of claim 13, further comprising:
obtaining class vectors of the plurality of objects, respectively, by using the second neural network; and
obtaining the class vector of the target object adjacent to the class vectors of the plurality of objects, based on the second distance information from the center of the synthesis region to the plurality of objects, respectively, by using a word embedding lookup table generated based on the second neural network.

15. The operating method of claim 14, further comprising obtaining the class vector of the target object by allocating a higher weight to a class vector of an object among the plurality of objects that is located closer to the center of the synthesis region.

16. The operating method of claim 13, further comprising generating the target object image corresponding to the class vector of the target object, by using a third neural network among the one or more neural networks.

17. The operating method of claim 16, further comprising:
extracting synthesis region image features corresponding to an image of the synthesis region, by using a fourth neural network among the one or more neural networks; and
generating the target object image corresponding to the class vector of the target object, by reflecting the synthesis region image features to the target object image, by using the third neural network.

18. The operating method of claim 17, further comprising combining the input image with the target object image to which the synthesis region image features are reflected, by using a fifth neural network among the one or more neural networks.

19. The operating method of claim 11, further comprising:
generating an updated target object image based on a user input for controlling the target object image included in the displayed composite image; and
displaying an updated composite image by combining the input image with the updated target object image.

20. A non-transitory, computer-readable recording medium having recorded thereon a computer program which, when executed by a processor, causes the processor to execute an operating method of an electronic device, the operating method including:
receiving a selection of a synthesis region in an input image;
detecting, by using one or more neural networks, at least one object in the input image;
obtaining distance information indicating a distance between a location of the synthesis region and a location of the at least one object;
obtaining, by using the one or more neural networks, a target object image to be located in the synthesis region of the input image, by using identification information for identifying the at least one object detected in the input image and the distance information;
generating, by using the one or more neural networks, a composite image by combining the input image with the target object image; and
displaying the composite image on a display.

* * * * *